United States Patent [19]
Washisu

[11] Patent Number: 5,734,932
[45] Date of Patent: Mar. 31, 1998

[54] IMAGE STABILIZING DEVICE FOR CAMERA

[75] Inventor: Koichi Washisu, Tokyo, Japan

[73] Assignee: Canon Kabushiki Kaisha, Tokyo, Japan

[21] Appl. No.: 320,834

[22] Filed: Oct. 7, 1994

Related U.S. Application Data

[63] Continuation of Ser. No. 24,863, Feb. 26, 1993, abandoned, which is a continuation of Ser. No. 709,021, May 31, 1991, abandoned.

[51] Int. Cl.$^6$ .................................................. G03B 17/00
[52] U.S. Cl. .................................................. 396/55; 396/52
[58] Field of Search ........................... 354/70, 430, 222, 354/441; 396/52, 55

[56] References Cited

U.S. PATENT DOCUMENTS

| | | |
|---|---|---|
| 3,944,324 | 3/1976 | Tajima et al. |
| 4,780,739 | 10/1988 | Kawakami et al. ............ 354/430 |
| 4,965,619 | 10/1990 | Shikaumi et al. ............. 354/410 |
| 4,970,540 | 11/1990 | Vasey et al. .................. 354/70 |
| 5,084,724 | 1/1992 | Maeno ......................... 354/430 |
| 5,107,293 | 4/1992 | Sekine et al. ................. 354/430 |
| 5,124,741 | 6/1992 | O'Such et al. ................ 354/441 |

FOREIGN PATENT DOCUMENTS 54-55430   5/1979   Japan .

*Primary Examiner*—Russell E. Adams
*Attorney, Agent, or Firm*—Fitzpatrick, Cella, Harper & Scinto

[57] ABSTRACT

A camera image stabilizing apparatus includes a blur detecting device for detecting blur in an image; a blur compensating device for compensating blur in the image; a control device for controlling the blur compensating device, in response to an output from the blur detecting device; and a varying device for changing in accordance with shutter speed, at least one of an integration time constant of the control device, that of a high-pass filter, or the gain of a control loop.

42 Claims, 22 Drawing Sheets

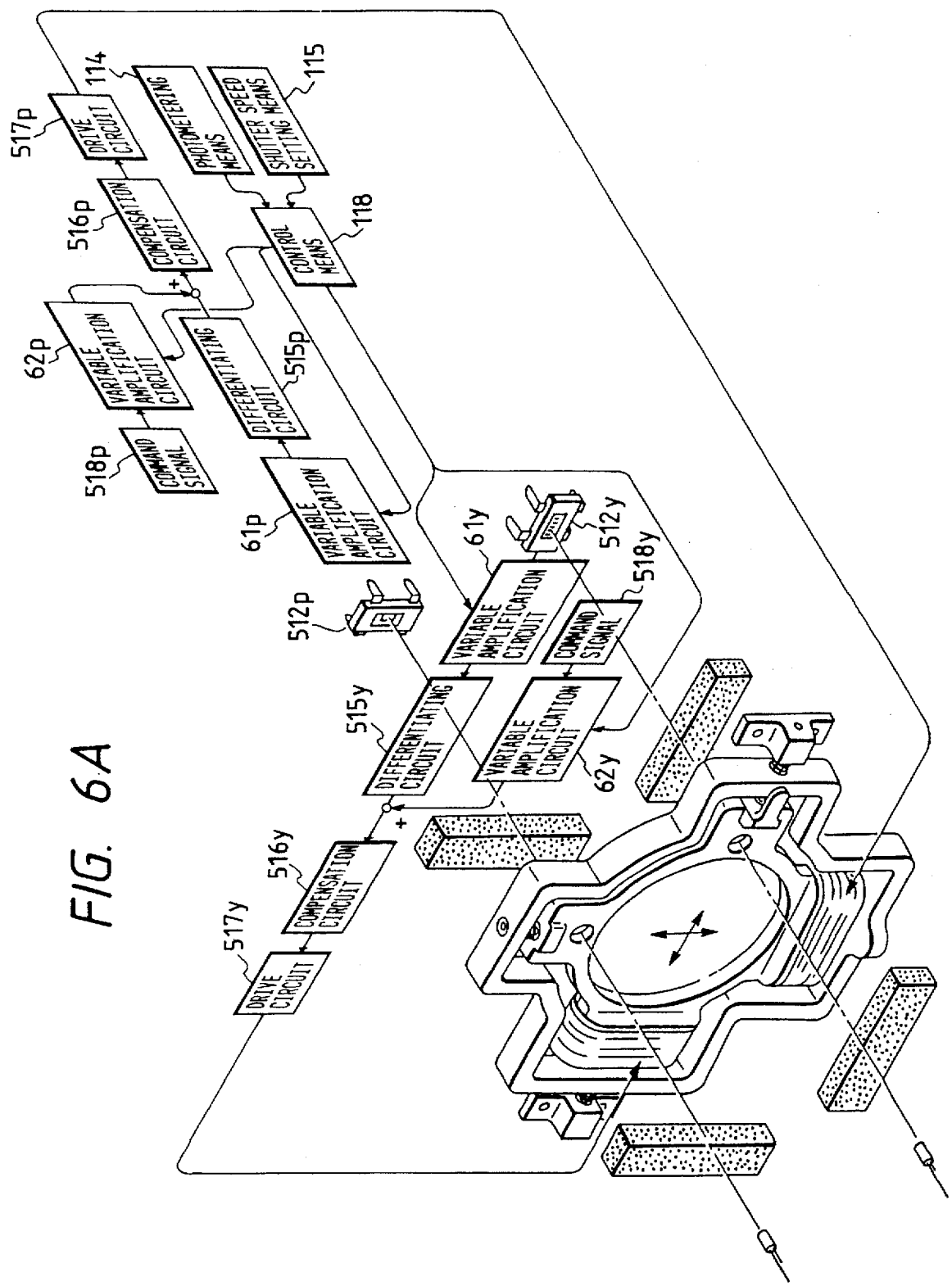

IMAGE STABILIZING DEVICE FOR CAMERA

This application is a continuation of application Ser. No. 08/024,863, filed Feb. 26, 1993, which is a continuation of application Ser. No. 07/709,021, filed May 31, 1991, both now abandoned.

BACKGROUND OF THE INVENTION

1. Field of the invention

The present invention relates to a control circuit for a vibration-proofing device of an apparatus susceptible to low frequency vibration waves, and, more particularly, to a system which is mounted on a device such as a camera, i.e., a photographing unit and which acts to stabilize a photographed image by detecting vibrations (camera shake) of a frequency of about 1 Hz to 12 Hz and by using the detected vibrations as information for stabilizing the image. In particular, the present invention relates to a control circuit for use in the above-described system.

2. Related Background Art

A conventional technology, which is the subject of the present invention, will now be described with reference to a case of an image stabilizing system for a device utilizing an image, such as a camera.

In modern photography, operations such as a determination of exposure and focusing which are important for photographing the image of a subject are usually automated. Therefore, a person which is not skilled in handling cameras rarely fails in operating the camera. However, there has not been available a system which is capable of automatically preventing image blur in photographing a subject resulting from the camera shake. Therefore, overcoming camera shake has depended upon the skill of the person who operates the camera. Accordingly, cameras capable of preventing the failure in photographing a subject due to the camera shake have been developed recently. In particular, a camera capable of preventing a failure in photographing a subject due to camera shake caused by a photographer has been researched and developed.

The camera shake takes place in the form of vibrations, the frequency of which is usually 1 Hz to 12 Hz. In order to take a picture without an image blur, even if the camera has been shaken at the time of the release of the shutter of the camera, vibrations generated due to the above-described camera shake must be detected and, for example, a compensating lens must be displaced in accordance with the detected value.

The camera shake can in principle be detected by a structure constituted in such a manner that a vibration detecting means, for detecting the angular acceleration and the angular velocity, and a calculating means, for electrically or mechanically integrating a detection signal so as to output the angular deviation, are mounted on the camera.

Then, the principle structure of the image stabilizing system for a camera constituted in such a manner that an angular velocimeter is employed as the vibration detecting means will now be described with reference to FIG. 9. FIG. 9 illustrates an example of a system for stabilizing the camera shake denoted by an arrow 91 due to a vertical shake 91p and a lateral shake 91y.

Referring to FIG. 9, reference numeral 92 represents a lens barrel having an imaging optical system for forming an image and 93p and 93y represent angular velocimeters for respectively detecting the angular velocity of the vertical shake and that of the lateral shake of the camera for detecting the image blur. The directions in which the corresponding angular velocities are detected are represented by 94p and 94y. Reference numerals 95p and 95y represent calculating means for integrating the signals respectively transmitted from the above-described angular velocimeters 93p and 93y so as to be converted into the angular deviations due to the camera shake. In accordance with the signals thus-converted, compensating optical means 96 (reference numerals 97p and 97y represent drive portions of the compensating optical system of the compensating optical means 96, and 98p and 98y represent position detecting sensors of the compensating optical systems 97p and 97y) is operated so that the image on an image surface 99 is stabilized.

In the system thus-constituted, the operation must be performed in such a manner that the angular velocity is detected by the angular velocimeters 93p and 93y serving as the vibration detection means, the detected angular velocity is integrated so as to obtain the angle of the shake and the compensating optical means is operated in accordance with the angle of the shake thus-obtained. That is, the calculating means must have an integral function.

FIG. 8A illustrates a Bode diagram of the integral characteristic required for the above-described integral function. Referring to FIG. 8A, a line 81, designating the gain, shows the integral characteristic (one-order integral characteristic of 20 [dB/dec]) in a range exceeding 0.1 Hz.

As described above, since the camera shake takes place in the form of a frequency of 1 Hz to 12 Hz, it might be considered sufficient for the integral characteristic to integrate 1 Hz or higher frequencies. However, if the characteristic, of integrating 1 Hz or higher frequencies, is established as shown in FIG. 8B, line 84 designating the phase does not show the satisfactory integral characteristic (the phase delayed by 90 degrees from the incidental angular velocity) in the vicinity of a frequency of 1 Hz although the line 83 designating the gain is able to show the satisfactory characteristic. Therefore, an image stabilizing system capable of accurately stabilizing an image cannot be realized if the above-described excessively large phase deviation cannot be overcome. As a result, a characteristic having a large time constant (that is, the greater the time constant, the more the bent point of the curve of the gain 81 approaches, in the Bode diagram, the low frequency side) as shown in FIG. 8A is employed because the deviation of a phase 82 in the camera-shake frequency range is small.

Referring to FIG. 8C, when a signal transmitted from the angular velocimeter is supplied to a terminal 88, a terminal 89 outputs an angle of the shake. Therefore, the accuracy of the angle of a shake larger than 1 Hz can be assured as designated by the phase 82 shown in FIG. 8A. However, if a structure having such a large time constant is used, the following problems arise:

First, if the time constant is large, it takes a long time for the output to be stabilized. For example, when the bent point shown in FIG. 8A is, for example, present at 0.1 Hz, the time constant is 1.59 seconds. Therefore, it takes two seconds for the output to be stabilized, thereby forcing a photographer to wait while holding the camera.

The reason the photographer must wait for the stabilization while holding the camera is that: if, for example, an excessively large camera shake takes place due to the fact the photographer holds the camera over again after a vibration-proof switch for starting the above-described image stabilizing system has been depressed, the input vibration detected by the system exceeds the dynamic range of each of the angular velocimeters and that of the calculating means. Therefore, the system must be restarted by resetting it for the purpose of stably detecting the angle of the shake.

Since the integrator having the above-described characteristic amplifies the range (1 Hz) lower than the camera shake (10 times in a case shown in FIG. 8D) although the gain 83 of the integrator has the characteristic of integrating a range higher than 1 Hz, the following error is generated. That is, gravitational, disturbance or the like acts on the vibration detecting means of an angular velocimeter or the like. Therefore, very-low frequency noise is present. As a result, if the output of this type is integrated by the integrator shown in FIG. 8A, the above-described very-low frequency noise is unfortunately also amplified.

FIG. 8E illustrates a state where the image stabilizing system is used in a state where an error of the above-described type is included. The movement of the compensating lens, in a case where the compensating optical means is driven with the output denoting the integration and including the above-described error when an actual camera shake takes place as designated by a sine wave 810, is shown by a waveform 811. A difference 812 between the sine wave 810 denoting the camera shake and the waveform 811 is the quantity of the residual shake after the image has been stabilized. A residual shake quantity 814 is generated during a film exposure 813 by the quantity of the very low frequency noise of the vibration detection means amplified by the integrator.

The above-described error will rarely present a problem in that the image blur cannot be sufficiently compensated during the photographing operation.

Although the above-described two problems arise, it can be said that the above-described waiting time actually becomes no critical problem for an actual camera because a slow shutter speed of, for example, ⅛ S, at which the above-described waiting time is unsatisfactory, is usually a photographic mode in which "the subject is photographed without haste", but the same is not a photographic mode in which "the shutter releasing opportunity is taken" and which is not frequently used at the photographic operation.

However, the above-described problem of the low frequency noise will, in addition to the problem of the above-described waiting time, raise a fear that the image blur for each frame of a film cannot be sufficiently corrected in a case of a normal photographic mode (for example, a normal shutter speed of about ⅓₀ S).

In a case where an image stabilizing system of the type described above is mounted on a latest style camera including an automatic exposure mechanism and/or an automatic focusing mechanism, a user is disappointed with the system if the accuracy of stabilizing the image is unsatisfactory. As a result, a critical problem will arise in that the value and the estimation of the camera are greatly reduced.

SUMMARY OF THE INVENTION

To this end, an object of the present invention is to provide a camera image stabilizing apparatus comprising: blur detecting means for detecting a blur of an image; blur compensating means for compensating the blur of the image; control means for controlling the blur compensating means in response to the output from the blur detecting means; and varying means for changing the integration time constant of the control means, that of a high-pass filter or the gain of a control loop in accordance with shutter speed, whereby the image blur can be properly prevented in accordance with the shutter speed.

Another object of the present invention is to provide a camera image stabilizing apparatus according to the above-described structure in which the integration time constant of the control means, that of a high-pass filter or the gain of a control loop is reduced in accordance with the rise in the shutter speed, whereby the waiting time necessary to stabilize the image at the normal shutter speed or high shutter speed can be shortened and an influence of low frequency noise due to an integrating operation is prevented so that the image can be accurately stabilized.

A further object of the present invention is to provide a camera image stabilizing apparatus according to the above-described structure in which the integration time constant of the control means, that of a high-pass filter or the gain of a control loop is increased in accordance with the reduction in the shutter speed, whereby a further accurate photographic operation can be performed rather than shortening the waiting time when the shutter speed is relatively low, for example, ⅛ S or higher so that a photographic operation, while preventing the image blur, can be performed.

Other and further objects, features and advantages of the invention will be apparent from the following description.

DESCRIPTION OF THE DRAWINGS

FIGS. 1A and 1B illustrate the characteristic of an apparatus for use in Embodiment 1 according to the present invention;

FIG. 1C illustrates a circuit for performing an integrating process according to Embodiment 1;

FIGS. 2A to 2I illustrate Embodiment 2 of the present invention;

FIG. 2A illustrates the characteristic when a time constant changing means is provided in a calculating circuit having a high-pass filter;

FIG. 2B schematically illustrates the calculating circuit;

FIG. 2C illustrates a specific structure of the circuit;

FIG. 2D is a circuit diagram which illustrates a modification to Embodiment 2;

FIG. 2E illustrates its specific circuit structure;

FIG. 2F illustrates its characteristic;

FIG. 2G schematically illustrates a conventional circuit having the high-pass filter;

FIG. 2H illustrates its specific circuit structure;

FIG. 2I illustrates its characteristic;

FIG. 5A illustrates the structure of a compensating optical means;

FIG. 5B illustrates its characteristic;

FIG. 5C illustrates the integrating operation;

FIGS. 6A and 6B illustrate Embodiment 5 constituted by employing the present invention in the structure shown in FIG. 5;

FIG. 6A illustrates the structure of a control circuit;

FIG. 6B illustrates its characteristic;

FIG. 7A illustrates a control circuit;

FIG. 7B illustrates its characteristic;

DESCRIPTION OF THE PREFERRED EMBODIMENTS

Figure 1A:
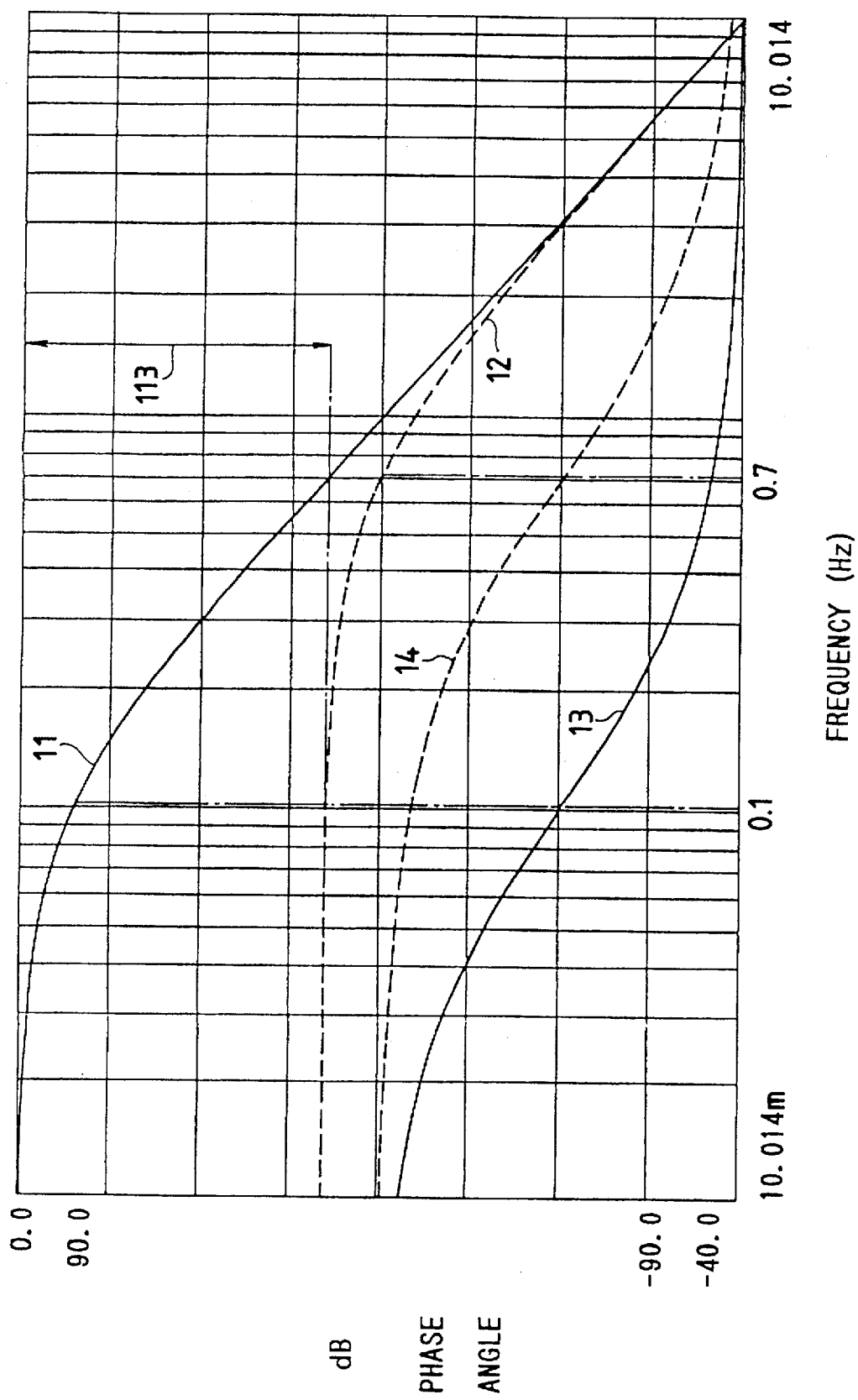
FIGS. 1A to 1C illustrate the structure of Embodiment 1 of a camera having an image stabilizing apparatus according to the present invention.

Preferred embodiments of an image stabilizing device according to the present invention and a camera having the image stabilizing device according to the present invention will now be described with reference to the drawings. Referring to the drawings, the same elements are given the same reference numerals.

Embodiment 1

FIG. 1A illustrates the characteristics of an integrator arranged in such a manner that a time constant changing means is, according to the present invention, provided for a calculating means. The integrator according to the present invention is constituted in such a manner that a conventional integrator having a characteristic (designated by a line 11) capable of integrating 0.1 Hz or higher is arranged to further possess a characteristic 12 capable of integrating 0.7 Hz or higher. According to this embodiment, the characteristic 12 is capable of integrating 0.7 Hz or higher at, for example, a shutter speed of 1/60 S.

The reason why it is preferable that the characteristic capable of integrating 0.7 Hz or higher be employed in a case where the shutter speed is 1/60 S will now be described. In a case where the integrator of this type is used, the phase of a line 16 showing the movement of a compensating lens is deviated from a signal denoting an actual shake 15 (it can also be understood from a fact that the line 14 designating the phase of the integrator for integrating 0.7 Hz or higher and shown in FIG. 1A generates a phase deviation in the camera shake region exceeding 1 Hz). Therefore, an error appears between a line 17, designating the quantity of the blur of the image surface after the compensation, and an actual shake 15 by a quantity which corresponds to the phase difference of a movement 16 of the compensating lens. As can be seen from FIG. 1B, an error 19 at a shutter speed of 1/60 S can be reduced to a quantity which can be compensated although an error 18 at a shutter speed of 1/8 S exceeds a range in which the blur can be compensated.

Figure 1B:
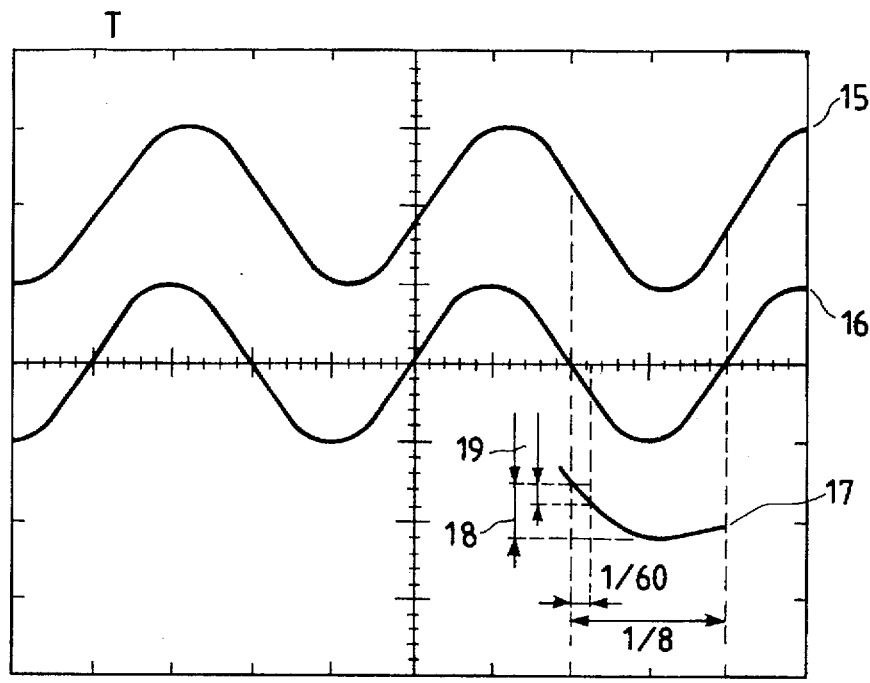

As can be clearly seen from FIG. 1B, in a case where a higher shutter speed is employed, the time constant of the integrator is further reduced (for example, the integration characteristic is changed to that capable of integrating 1.1 Hz at a shutter speed of 1/150 S). It can be understood that if a high speed shutter speed, for example, a speed of "1/focal distance" is employed at the time of the photography operation, the handling facility similar to an ordinary camera can be realized by enlarging the integrated time constant to an extremely large value (that is, the output from the integrator is extremely enlarged so that the compensating optical mechanism is not operated).

A structure capable of performing the above-described control can be exemplified by a structure arranged in such a manner that a circuit serving as a control means for changing the characteristic as shown in FIG. 1A, i.e., a determination unit for determining the characteristic, is constituted by connecting a parallel circuit composed of a resistor 111 and a capacitor 112 to a negative feedback passage of a calculating amplifier 110 so as to vary the resistance of the resistor 111. In a case where the capacity of the capacitor 112 is 1 μF and the resistance of the resistor 111 is 1.6 M Ω, the characteristic capable of integrating 0.1 Hz or higher as shown in FIG. 1A can be obtained. In a case where the resistance of the resistor 111 is reduced to 227 k Ω, the characteristic capable of integrating 0.7 Hz or higher and designated by the dashed line shown FIG. 1A can be obtained.

Figure 1C:
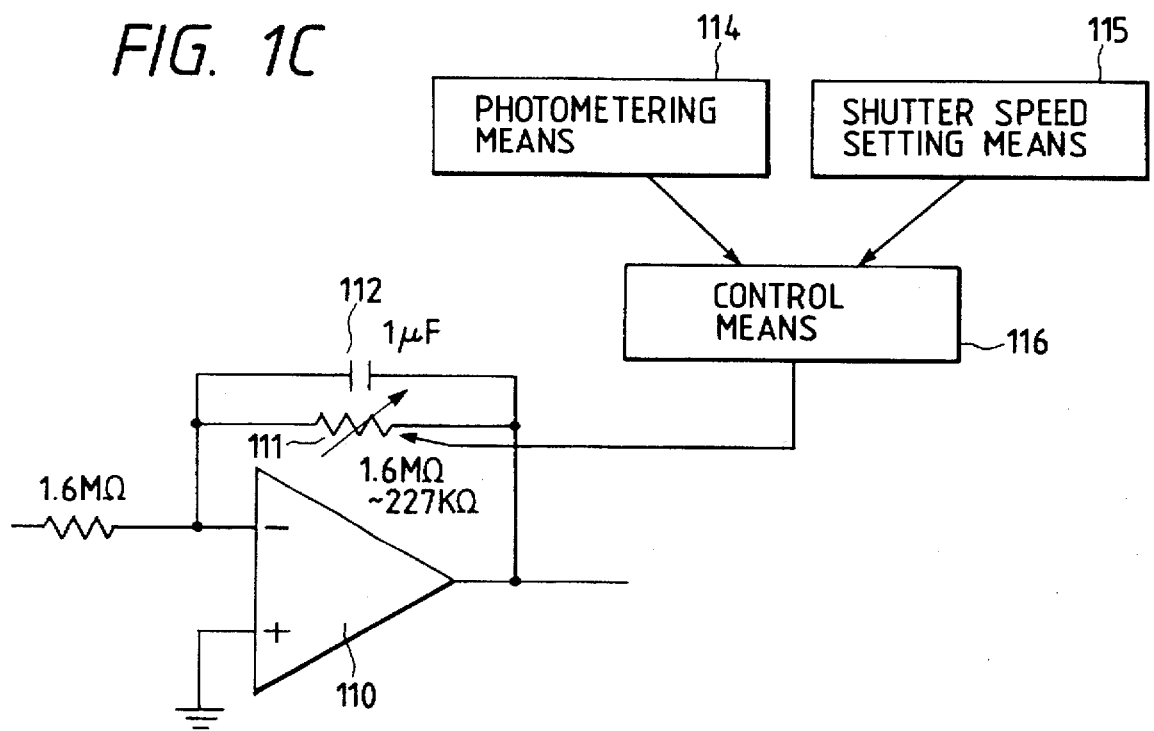

That is, referring to FIG. 1C, a control means 116 changes the resistance of the resistor 111 from 1.6 M Ω to 227 k Ω in accordance with the change in the set shutter speed from 1/8 S to 1/60 S in response to the output i.e., the state signal from a photometric means 114 or that from a shutter speed setting means 115 with which a shutter speed desired by a photographer can be set. In a case where the shutter speed is 1/8 S or lower, the resistance of the resistor 111 is fixed to 1.6 M Ω. On the other hand, in a case where the shutter speed is 1/60 S or higher, the resistance of the resistor 111 is fixed to 227 k Ω.

The means for controlling the resistance of the resistor 111 in accordance with the result of the selection of the shutter speed can be realized by a structure arranged in such a manner that the resistor 111 comprises a cadmium sulfide (CdS) electric field effect type transistor (FET).

When the above-described normal shutter speed is employed in the above-described structure, the photographing operation can be performed after an extremely shortened waiting time. On the other hand, in a case where a 300 mm lens is used, the conventional problem of the camera shake, which can be overcome by setting the shutter speed to be a speed higher than 1/300 S, can be overcome even if the shutter speed is set to a slow speed lower than 1/60 S while preventing the image blur. Furthermore, if the photographer gently performs the photographic operation while carefully holding the camera, a subject can be photographed while preventing the image blur at a very slow shutter speed of 1/8 S or lower.

The control means for changing the integration time constant is not limited to the method shown in FIG. 1C. A system can be selected from a variety of systems. Furthermore, the time constant can, of course, be changed even if the integrator is arranged to comprise a digital filter.

Embodiment 2

According to the above-described embodiment, a description has been made about a structure arranged in such a manner that the time constant changing means is provided for the integrator. However, the calculating means is usually arranged in such a manner that a DC cut filter (bypass filter) 21 is, as shown in FIG. 2G, further provided together with the integrator. The reason for this lies in that DC bias voltage which will be generated in the vibration detecting means and the calculating means must be prevented.

Figure 2A:
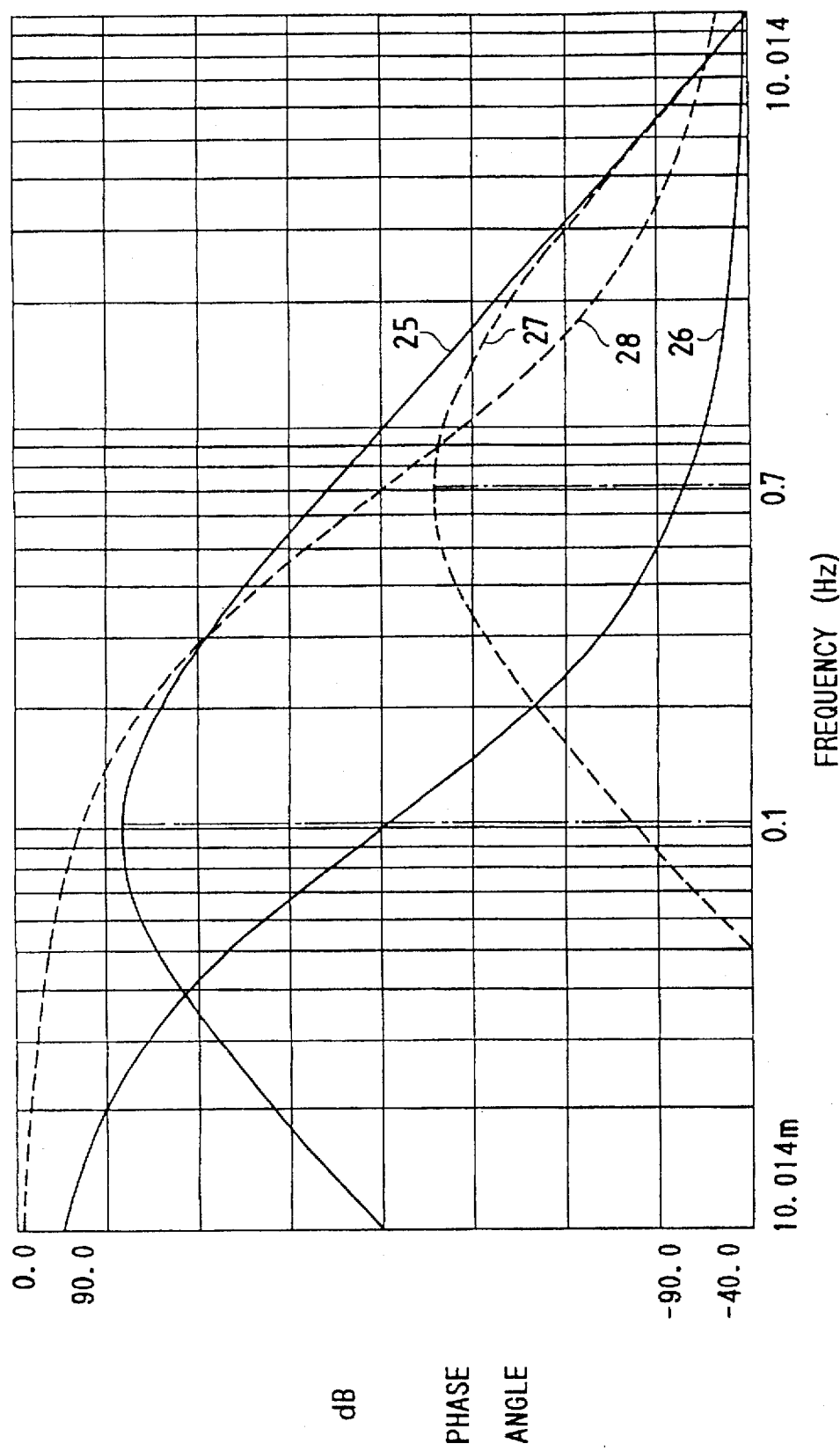
Figure 2B:
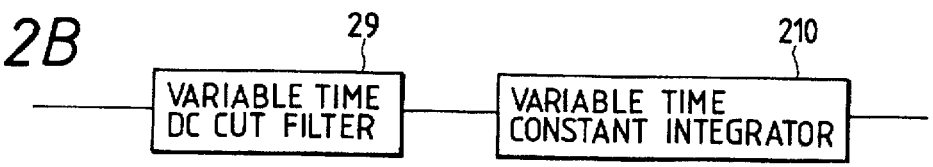
Figure 2C:
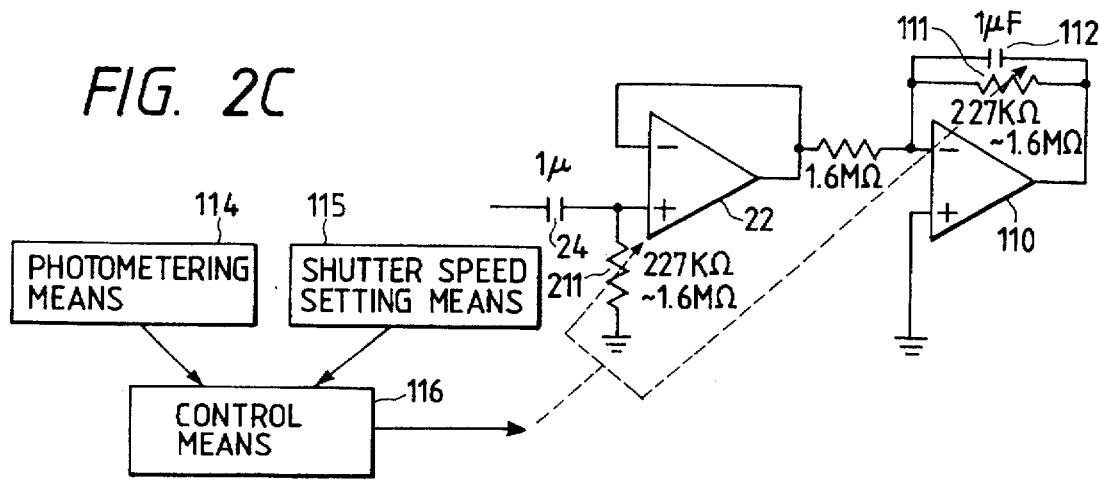
Figure 2D:
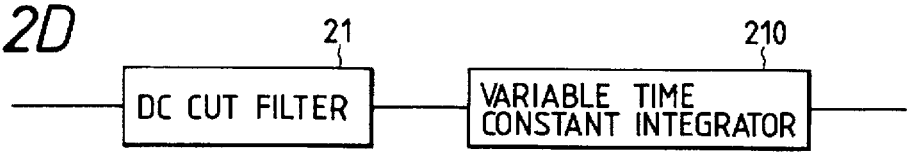
Figure 2E:
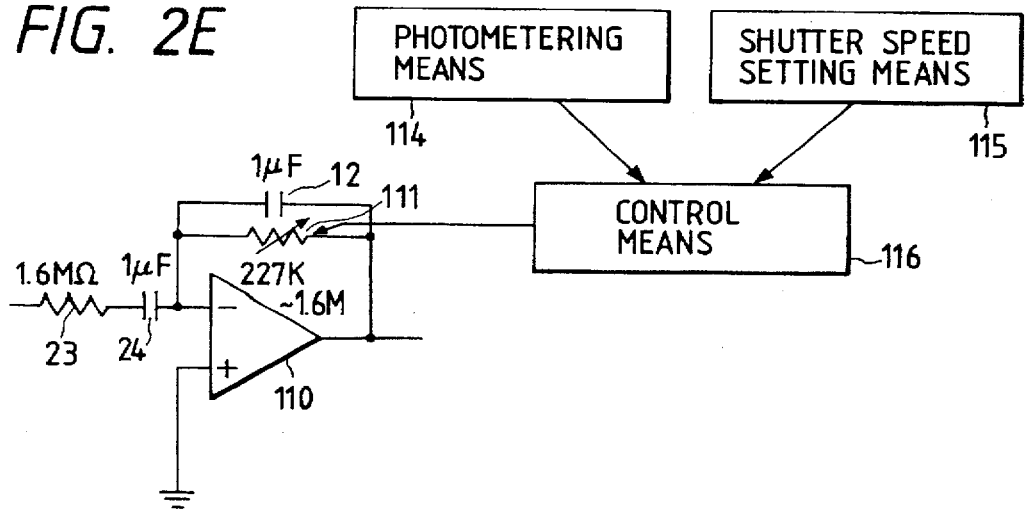
Figure 2F:
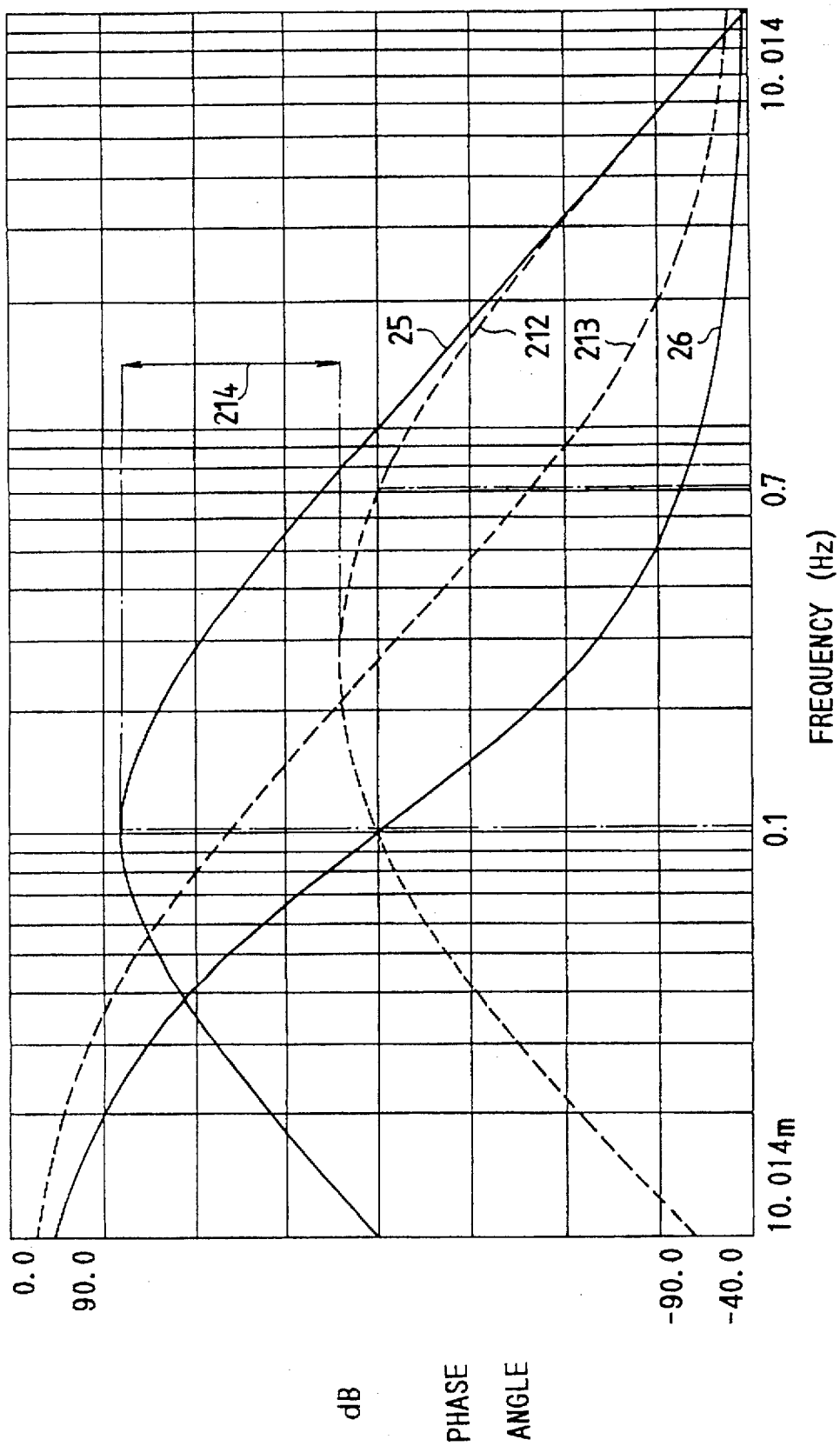
Figure 2G:
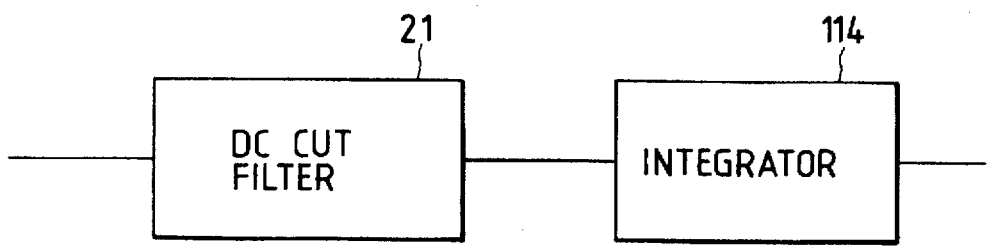
Figure 2H:
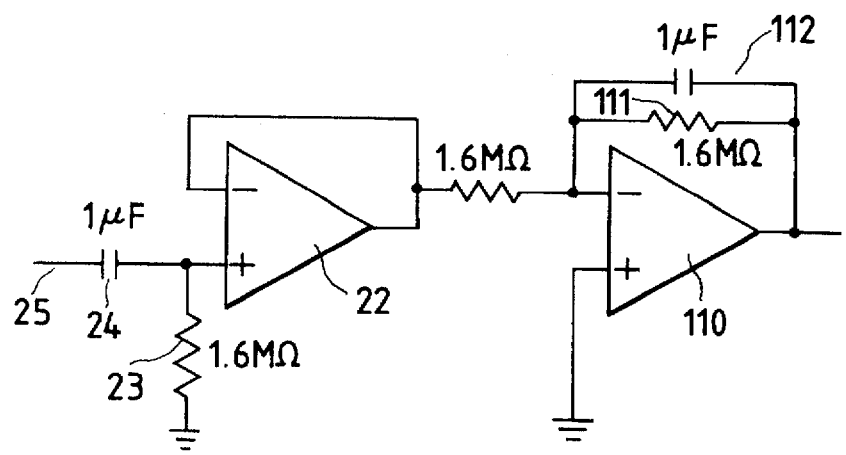
Figure 21:
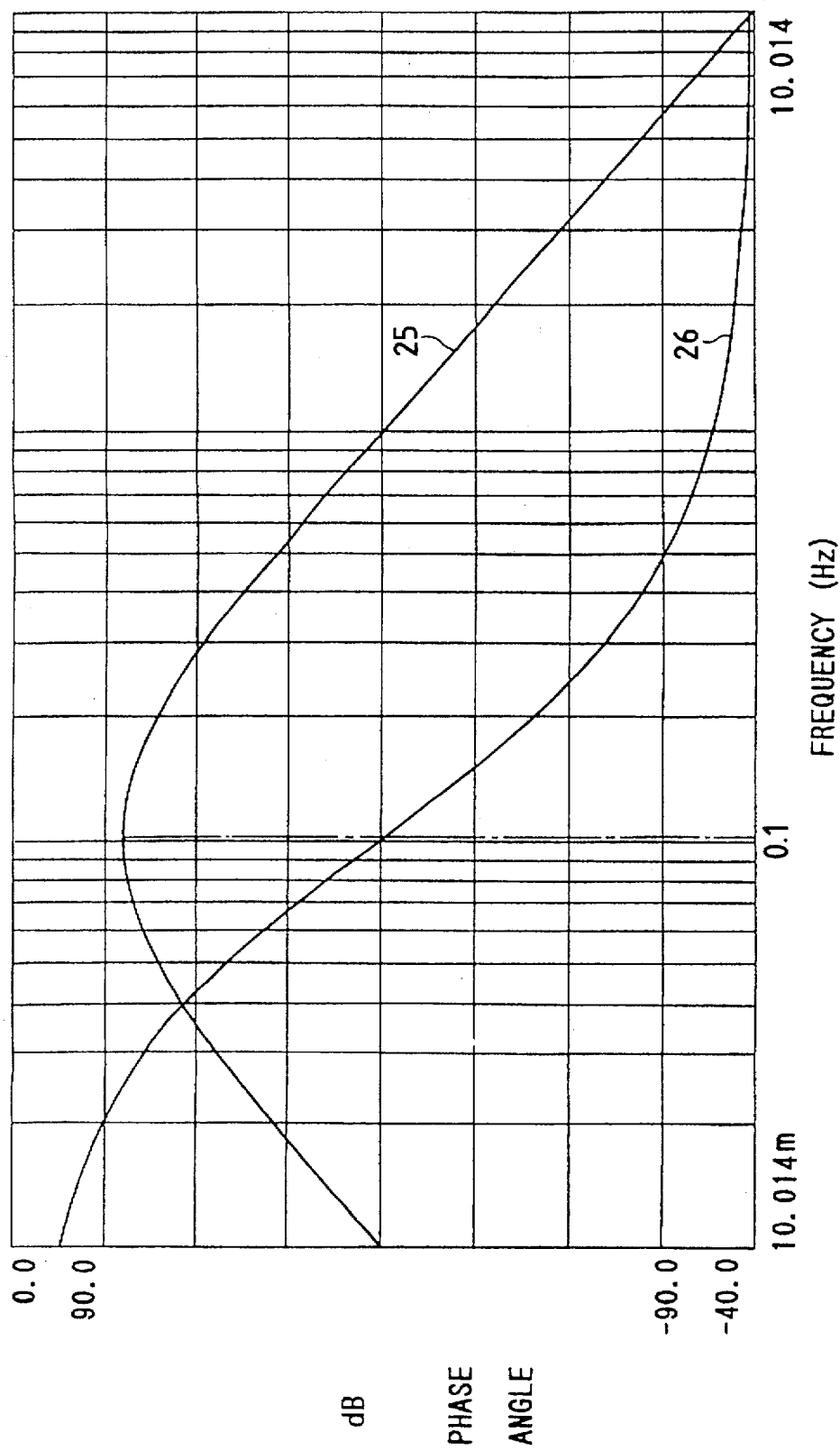

The DC cut filter 21 shown in FIG. 2G usually specifically comprises, as shown in FIG. 2H, a calculating amplifier 22, a resistor 23 and a capacitor 24. The characteristics of the circuit further comprising the integrator 114 are as shown in FIG. 2I. In the structure shown in FIG. 2G, it can be understood that a gain 25 shown in FIG. 2I is attenuated from 0.1 Hz. The reason for this lies in that the DC cut filter is arranged to attenuate the low frequency range by the time constant (1.6, that is, 0.1 Hz according to the example shown in FIG. 2G by setting the resistance to be 1.6 M Ω and the capacitance to be 1 μF) determined by the resistance of the resistor 23 of the DC cut filter 21 and the capacitance of the capacitor 24.

In a case where the present invention is adapted to the circuit thus-arranged, it is necessary for the structure to be arranged in such a manner that the gain is changed to that designated by a dashed line 27 shown in FIG. 2A.

FIG. 2B illustrates a circuit including a control means for controlling the above-described characteristic change. Specifically, the time constant of a DC cut filter 29 and that of an integrator 210 can be simultaneously changed by changing the resistance of a resistor 211 and that of the resistor 111, in sychronism, through by the control means 116 in accordance with the photometric means 114 or the shutter speed setting means 115 similarly to the case shown in FIG. 1C.

In the structure shown in FIG. 2B, the order of connecting the DC cut filter 29 and the integrator 210 may be inverted to obtain a similar effect.

A modification to the second embodiment can be exemplified by a structure shown in FIG. 2D. The structure according to this modification is, as specifically shown in FIG. 2E, arranged in such a manner that one calculating amplifier 110 is able to constitute the DC cut filter 21 and the integrator 210. According to this modification, the integrated time constant can be changed by arranging the structure in such a manner that the resistance of the resistor 111 can be changed by the control means 116 in accordance with the photometric means 114 or the shutter speed setting means 115 similarly to the above-described embodiment. As a result, the circuit thus-constituted is enabled to, at any time, select the changed characteristic as is shown by the gain designated by the dashed line 212 of FIG. 2F. According to this modification, an effect can be obtained in that the low frequency adjacent to 0.1 Hz is reduced as designated by an arrow 214 and thereby the low frequency cannot be amplified although the time constant of the DC cut filter 21 is not changed.

Embodiment 3

FIG. 3 illustrates a third embodiment of the present invention. This embodiment is characterized by an arrangement in which integrators having time constants of a variety of values and DC cut filters are provided in parallel with one another and one switch can be selected from switches 31 to 34 provided to serve as a control means in accordance with the shutter speed.

Figure 3A:
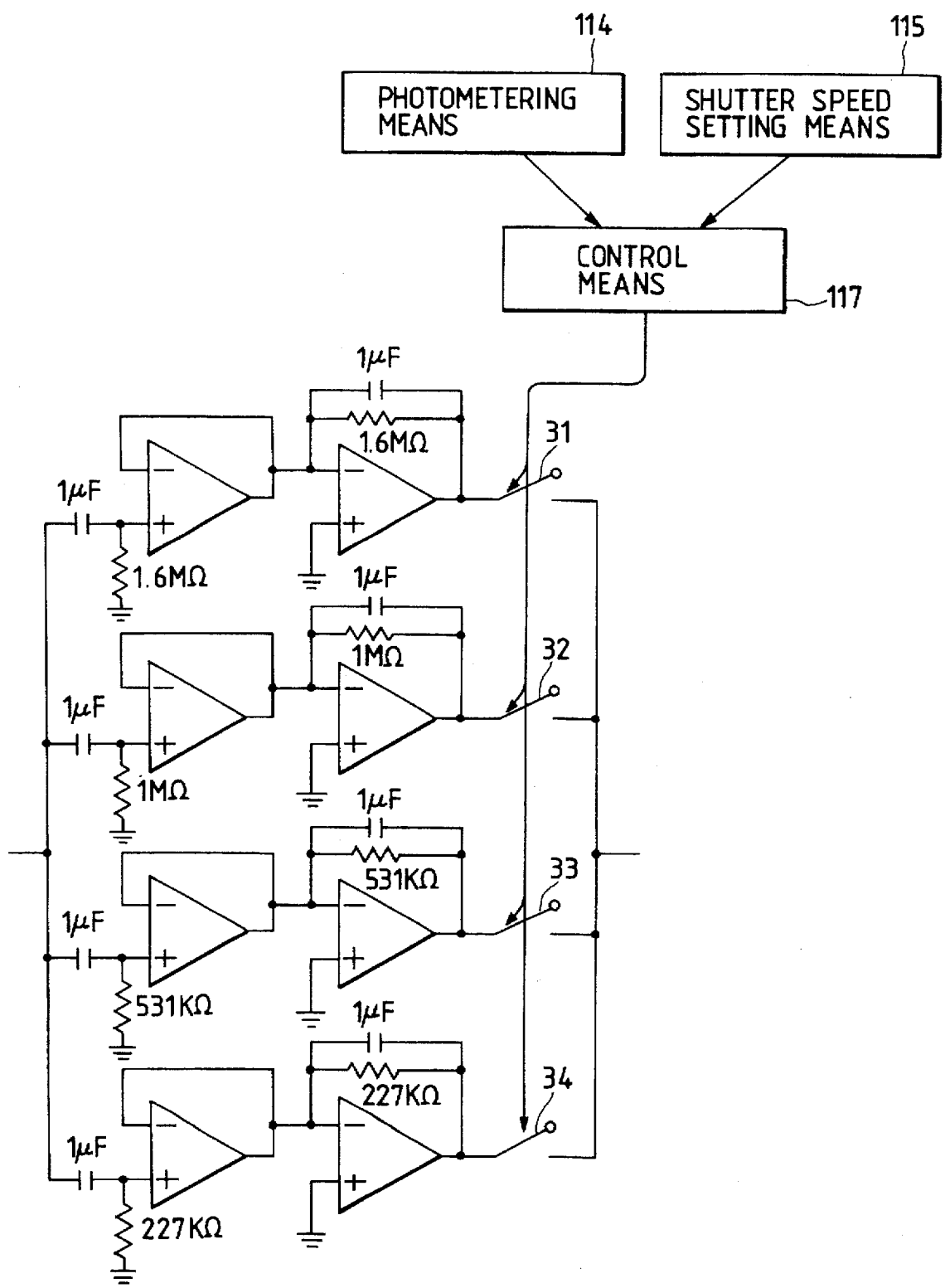
FIG. 3A illustrates a circuit according to Embodiment 3 of the present invention.

That is, referring to FIG. 3A, when the shutter speed is ⅛ S, a control means 117 selects the switch 31 so as to connect the integrator having a resistance of 1.6 M Ω in accordance with the set shutter speed in response to the output from the photometric means 114 or the shutter speed setting means 115 with which a shutter speed desired by a photographer can be set. When the shutter speed is 1/15 S, or higher, the control means 117 selects the switch 32 so that the integrator having a resistance of 1 M Ω is connected. When the shutter speed is 1/30 S, or higher, the control means 117 selects the switch 33 so that the integrator having a resistance of 531 k Ω is connected. When the shutter speed is 1/60 S or higher, the control means 117 selects the switch 34 so that the integrator having a resistance of 227 k Ω is connected.

The relationship between the shutter speed and the time constant has been described with reference to the above-described embodiments 1 to 3. However, the shutter speed determination in the camera which has the image stabilizing system is different from the conventional camera in the strict sense. It will now be described below. The major portion of the cameras developed recently has been arranged in such a manner that the exposure means for determining the shutter speed is arranged to perform an automatic exposing operation (for example, a TTL photometric system is employed) in which the external light is measured through a lens. As a result, if the light measuring operation is performed in a period (a period in which the output from the integrator and that from the DC cut filter are not stabilized yet) in which the compensating lens is being erroneously working in a case where the movable lens such as the compensating lens of the image stabilizing system is provided, light of a different position from the desired subject is undesirably measured.

Figure 3B:
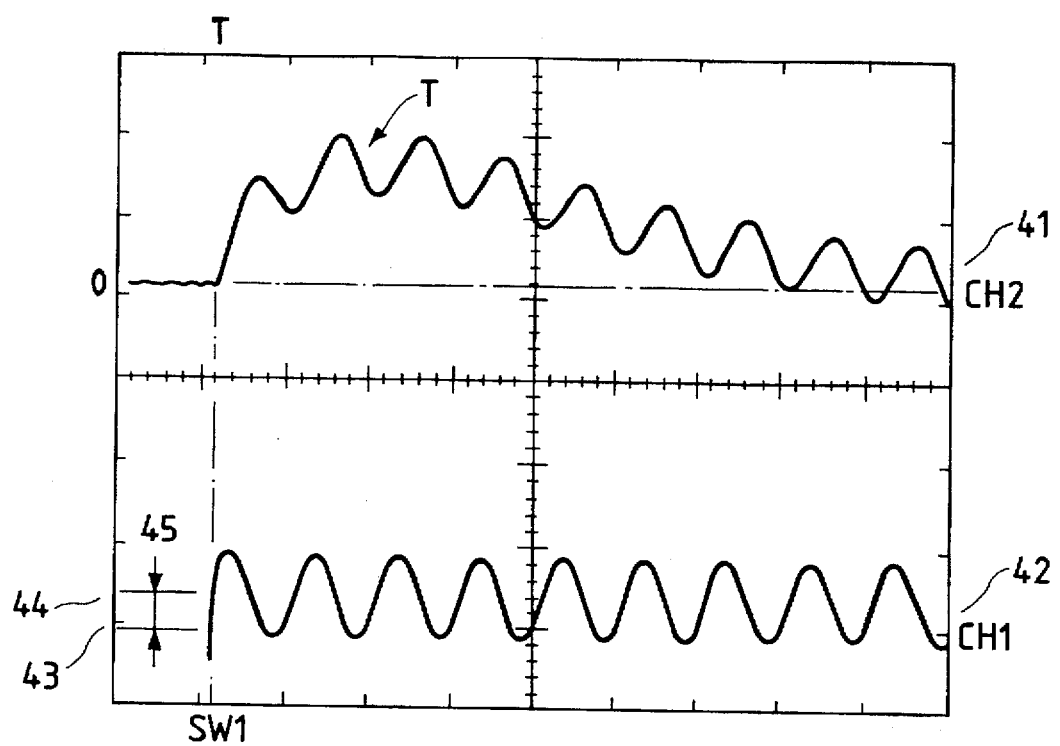
FIG. 3B illustrates the movement of a compensating lens at the time of a photometric operation.

FIG. 3B illustrates the above-described problem. A DC bias voltage is superposed on an output 42 transmitted from the angular velocimeter. A center 44 of the camera shake is set off from a GND 43 by a quantity designated by an arrow 45. When such an output is input to the calculating means and the compensating optical means is thereby operated in a state where, for example, the release button of the camera is depressed halfway (SW₁), the movement of the compensating lens first surges a large wave before it commences the vibration-proofing operation at a predetermined position.

It might therefore not be considered feasible to employ the conventional photometric system in a camera on which the image stabilizing system is mounted. However, the quantity of the change in framing, due to movement of the compensating lens taken place in a period in which the above-described wave is surged, is too small to change the result of the photometric value (change in the time constant). The framing, which is realized when the release button of the camera is depressed halfway is, of course, restored after the output from the calculating means has been stabilized. Therefore, proper exposure can, of course, be obtained while performing an accurate vibration-proof. As a result, it is unnecessary to provide a special means to prevent the movement of the compensating lens in the lens barrel. Therefore, the conventional TTL photometric system can be employed.

Embodiment 4

Figure 4:
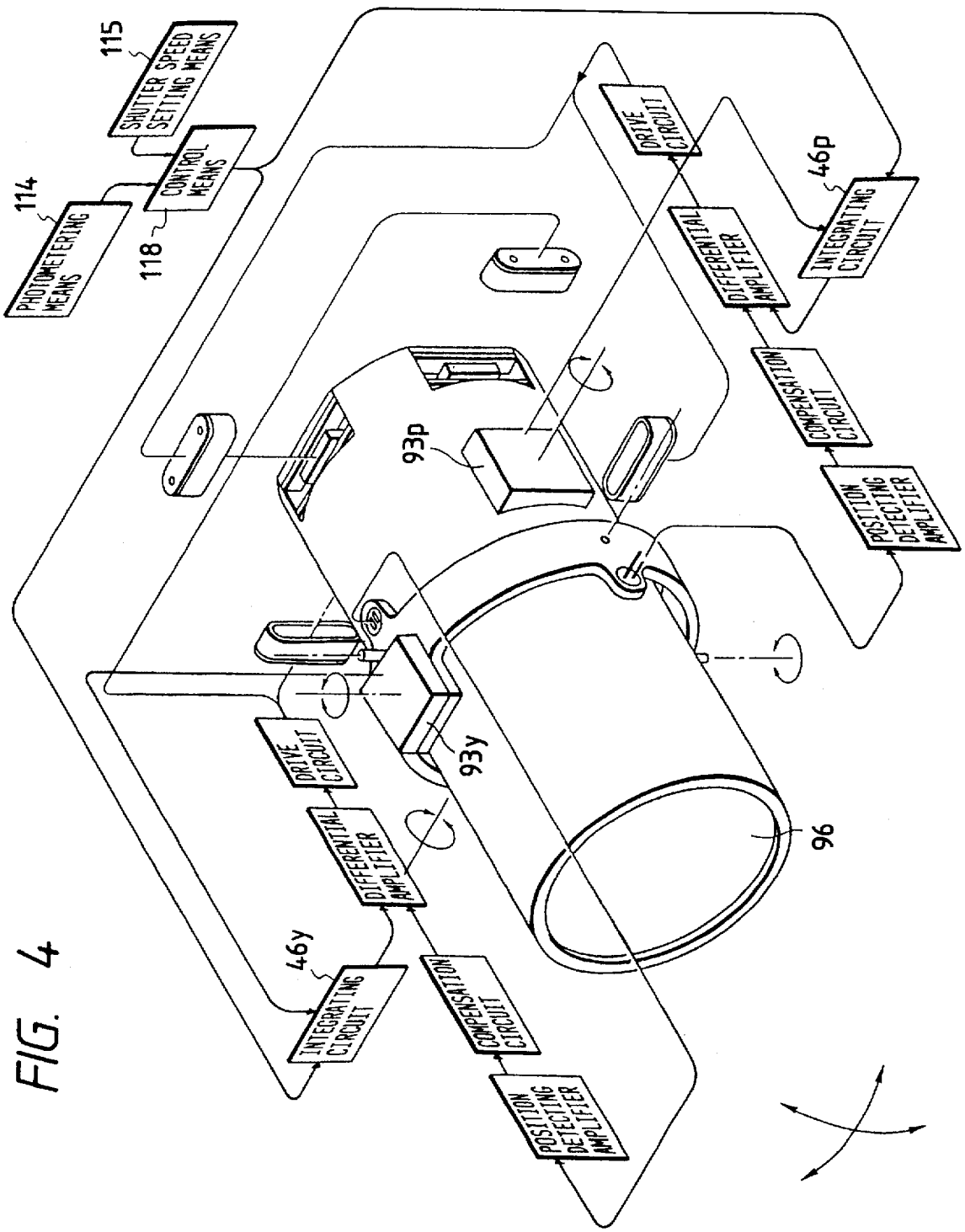
FIG. 4 illustrates the structure of Embodiment 4 of the present invention.
Figure 9:
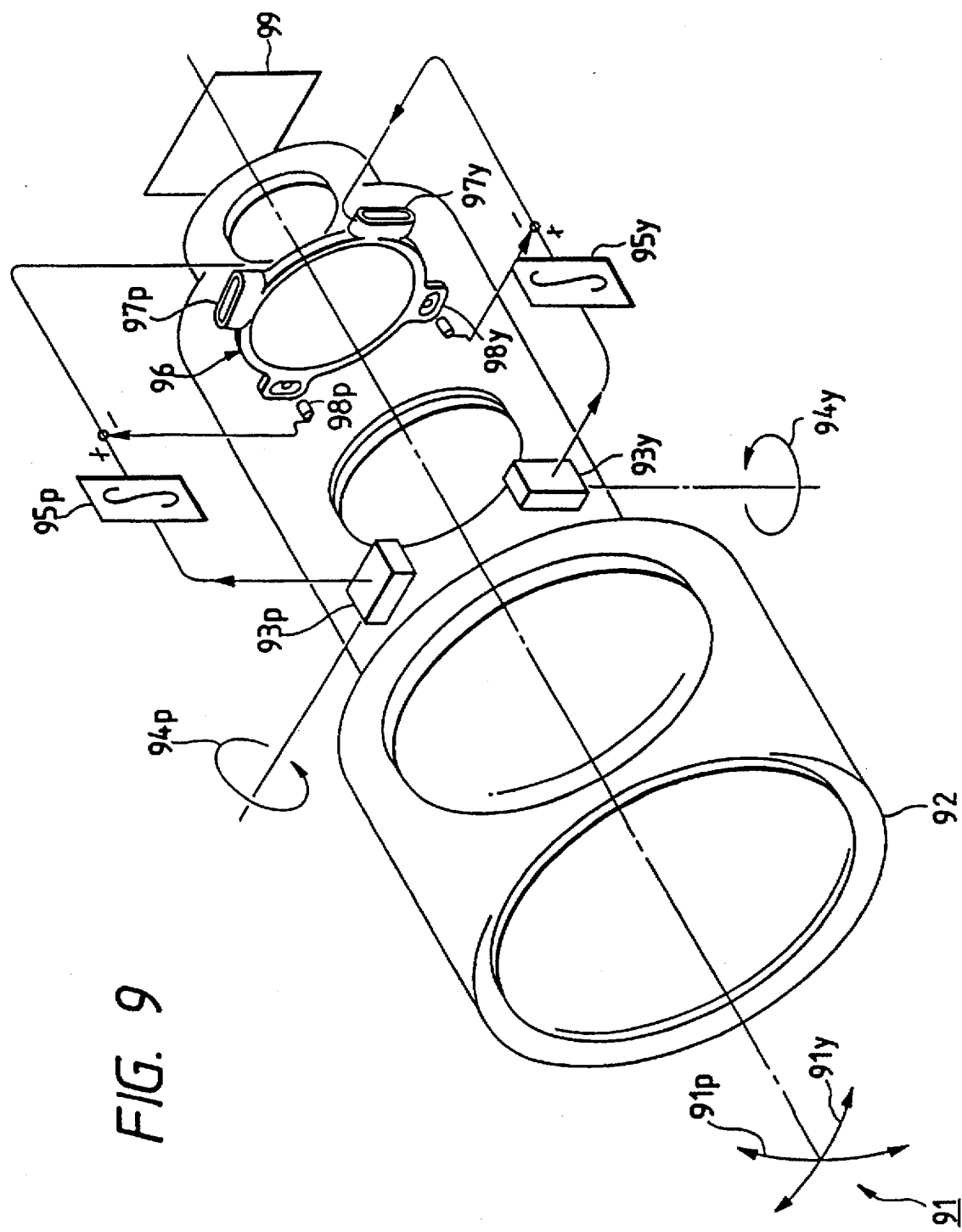
FIG. 9 illustrates the schematic structure of the image stabilizing system.

According to the foregoing discussion the structure is arranged in such a manner that the vibration detecting means secured to the conventional mirror barrel, which may serve as an image blur detection unit and which has been described with reference to FIG. 9, detects the camera shake and the compensating optical means, which may serve as an image blur prevention unit, is operated. However, the present invention is not limited to the above-described system. For example, the present invention can be adapted to a known zero method system which is, for example, as shown in FIG.4, arranged in such a manner that the vibration detecting means 93p and 93y are disposed on the compensating optical means and the compensating optical means is operated in such a manner that the outputs from the vibration detecting means 93p and 93y are made to be zero. That is, the object of the present invention can be achieved by switching over the time constant of each of the integrating circuits 46p and 46y by any one of the systems according to the above-described embodiments 1 to 3 in accordance with the shutter speed.

Embodiment 5

The above-described embodiments 1 to 4 are arranged in such a manner that the control means changes the time constant of the calculating means. In order to obtain the similar effect, the present invention may be arranged in such a manner that the drive means of the compensating optical means is controlled.

The principle of a structure in which the drive means of the compensating optical means is controlled will now be described before detailing the specific structure of this embodiment.

Figure 5A:
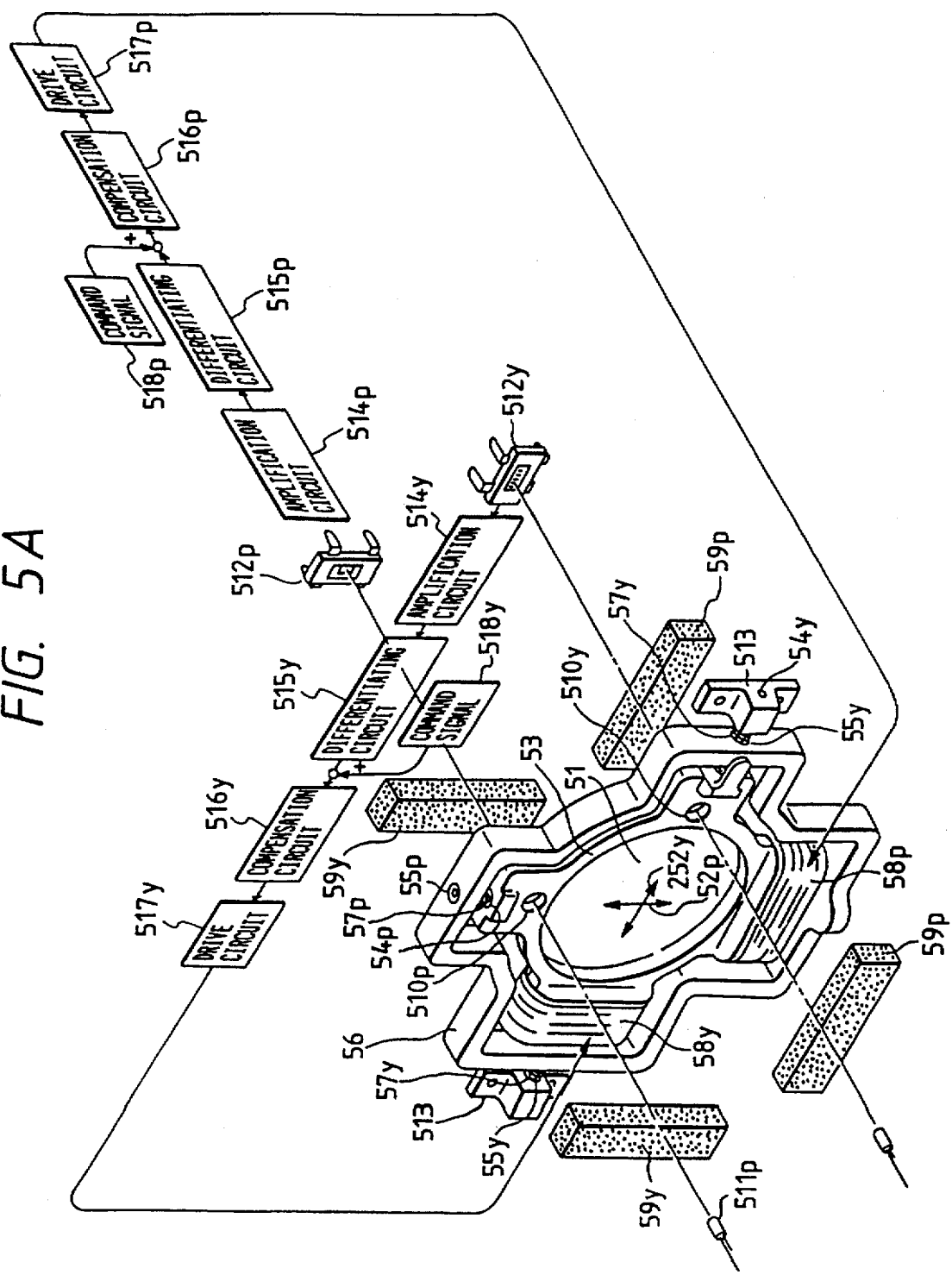
FIGS. 5A to 5C illustrate another conventional structures of the image stabilizing apparatus.

FIG. 5A illustrates the structure of the compensating optical means which can be adapted to a system of the above-described type. A compensating lens 51 is disposed in such a manner that it can be moved in two directions (a pitching direction 52p and a yawing direction 52y) respectively perpendicular to the optical axis, the pitching direction 52p and the yawing direction 52y being perpendicular to each other. The structure will now be specifically described. Referring to FIG. 5A, a fixing frame 53 for holding the compensating lens 51 is arranged in such a manner that it can slide on a pitch slide shaft 55p via a sliding bearing 54p such as an oil-less metal. Furthermore, the pitch slide shaft 55p is fastened to a first holding frame 56.

The fixing frame 53 is held between pitch coil springs 57p, which are disposed axially to the pitch slide shaft 55p, so that it is held at a substantially neutral position.

A pitch coil 58p is fastened to the fixing frame 53. The pitch coil 58p is placed in a magnetic circuit comprising a pitch magnet 59p. As a result, the fixing frame 53 can be moved in the pitching direction 52p when an electric current is allowed to flow.

The fixing frame 53 has a slit 510p formed therein so as to detect the position of the fixing frame 53 in the pitching direction 52p from the relationship between a light emitting device 511p (for example, an infrared ray light emitting diode IRED) and a light receiving device 512p (for example, a semiconductor position detecting element PSD).

On the other hand, a yawing slide shaft 55y is fastened to the first holding frame 56 so that the first holding frame 56 is able to slide on a housing 513 to which a sliding bearing 54y such as an oil-less metal is fitted. Since the above-described housing 513 is fastened to a second holding frame (omitted from illustration), the above-described first holding frame 56 is able to move with respect to the second holding frame in the yawing direction 52y. Furthermore, since a yawing coil spring 57y is disposed coaxially to the yawing slide shaft 55y, the first holding frame 56 is positioned in a substantially neutral position similarly to the fixing frame 53.

In addition, a yawing coil 58y has a yawing coil 58y so that the fixing frame 53 and the first holding frame 56 are moved in the yawing direction 52y due to the relationship with the yawing magnetic 59y fastened to the second holding frame.

In addition, the fixing frame 53 has a slit 510y formed therein so as to detect the position of the fixing frame 53 in the yawing direction 52y.

A drive means for driving the thus-constituted compensating lens 51 in the pitching direction 52p and the yawing direction 52y is structured as described below:

An assumption is made about the structure that differentiating circuits 515p and 515y shown in FIG. 5A are omitted and amplifying circuits 514p and 514y are directly connected to compensating circuits 516p and 516y. When the outputs from the light receiving devices 512p and 512y are supplied to the coils (the pitching coil 58p and the yawing coil 58y) after the outputs have been amplified by the amplifiers 514p and 514y, the fixing frame 53 and the first holding frame 56 are driven, causing the output from each of the light receiving devices 512p and 512y to be changed. When the operational direction (the polarity) of each of the coils 58p and 58y is, at this time, such that the output from each of the light receiving devices 512p and 512y is reduced, a closed system is created between the compensating optical means and the drive means. As a result, the attitude of the compensating lens 51 is stabilized (a position control loop is created) at a point at which the outputs from the light receiving devices 512p and 512y are substantially zero.

The compensating circuits 516p and 516y act to stabilize the closed system thus-created, while the drive circuit 517p and 517y act to compensate the electric currents to be applied to the coils 58p and 58y.

When command signals 518p and 518y are issued, from outside, to the system thus-constituted, the compensating lens 51 is driven while closely following the command signal in the pitching direction 52p and the yawing direction 52y. Therefore, by supplying, as the above-described command signals, signals for spatially stabilizing the photographic optical axis in accordance with the camera shake, in the form of, for example, the outputs denoting the results of integrations of the outputs from the angular velocity sensors 93p and 93y by the integrators 95p and 95y, the desired image stabilization can be performed.

Figure 5B:
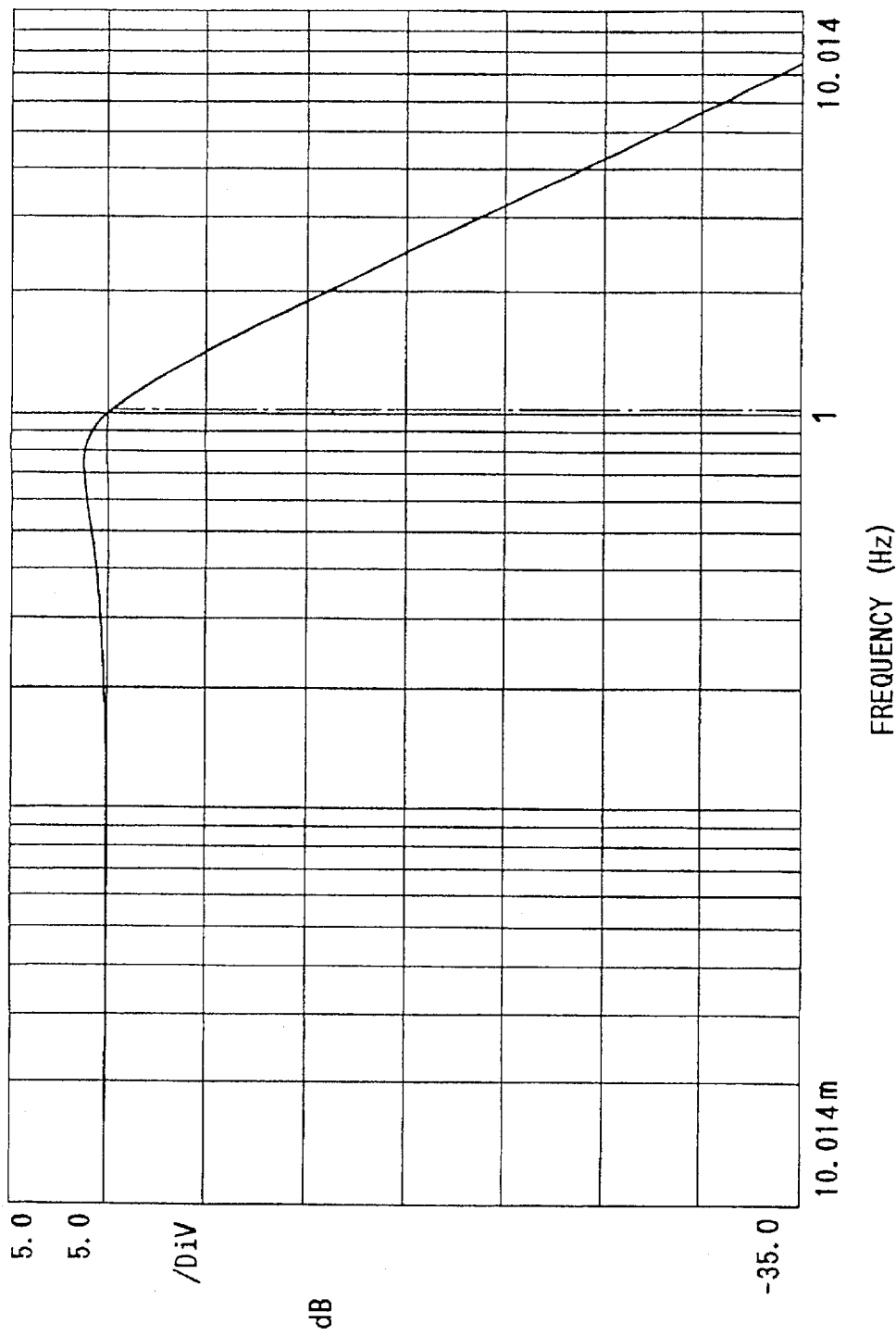
Figure 5C:
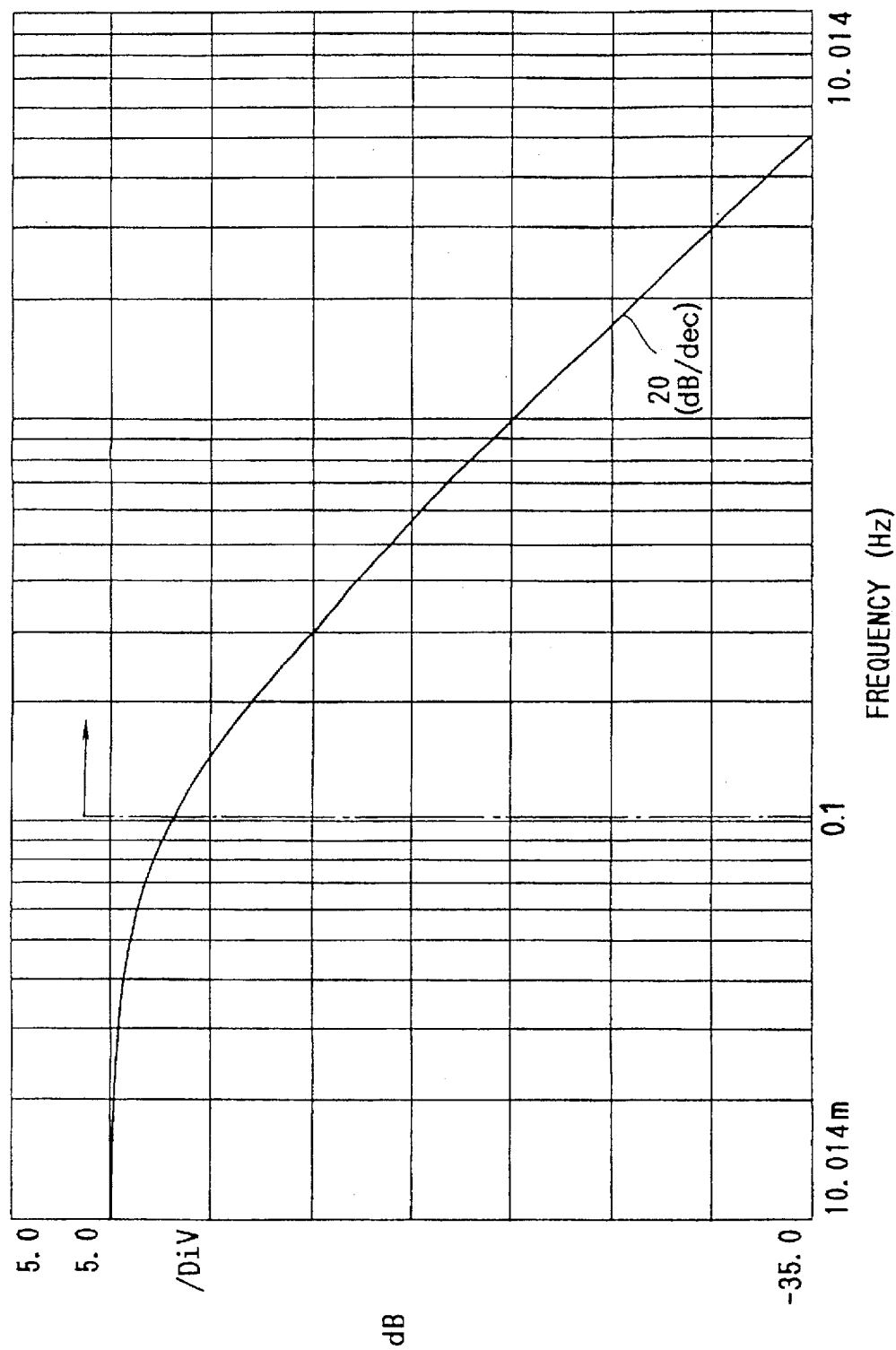

If the compensating optical means is arranged in such a manner that it has the integrating function, the calculating means can be omitted from the structure and the system can thereby be further simplified because the outputs from the angular velocity sensors 93p and 93y must simply be supplied to the compensating optical system. That is, referring to FIG. 5A, when the differentiating circuits 515p and 515y are connected in series between the amplifying circuits 514p and 514y and the compensating circuits 516p and 516y and a closed system is thereby formed between the compensating optical means and the drive means, the movement of the compensating lens 51 in response to the command signals 518p and 518y is as shown in the Bode diagram of FIG. 5C. The thus realized characteristics are those obtainable by, by a speed control loop, eliminating the peak of the Bode diagram (see FIG. 5B) about the movement of the compensating lens 51 caused when the amplifying circuits 514p and 514y and the compensating circuits 516p and 516y are disconnected and alternating voltage is applied to the coils 58p and 58y. The thus obtained characteristics has a function of one-order integrating 20 [dB/dec] at a frequency higher than 0.1 Hz (although omitted from illustration, 40 [dB/dec] at 10 [Hz]). Therefore, even if the shake angular velocity is used as the command signals 518p and 518y, the movement of the compensating lens 51 is converted into the angle of the shake. As a result, the necessity of providing the calculating means can be eliminated.

When the angular velocity is supplied to the compensating optical system, it is integrated by the input system so that the movement of the lens is converted into the angle.

The characteristic of 20 [dB/dec] (in a range between 0.1 and 10 Hz) shows a quantity corresponding to one-order integration.

The structure for controlling the time constant of the integrating function possessed by the compensating optical means in accordance with the shutter speed is arranged as shown in FIG. 6A.

Figure 6B:
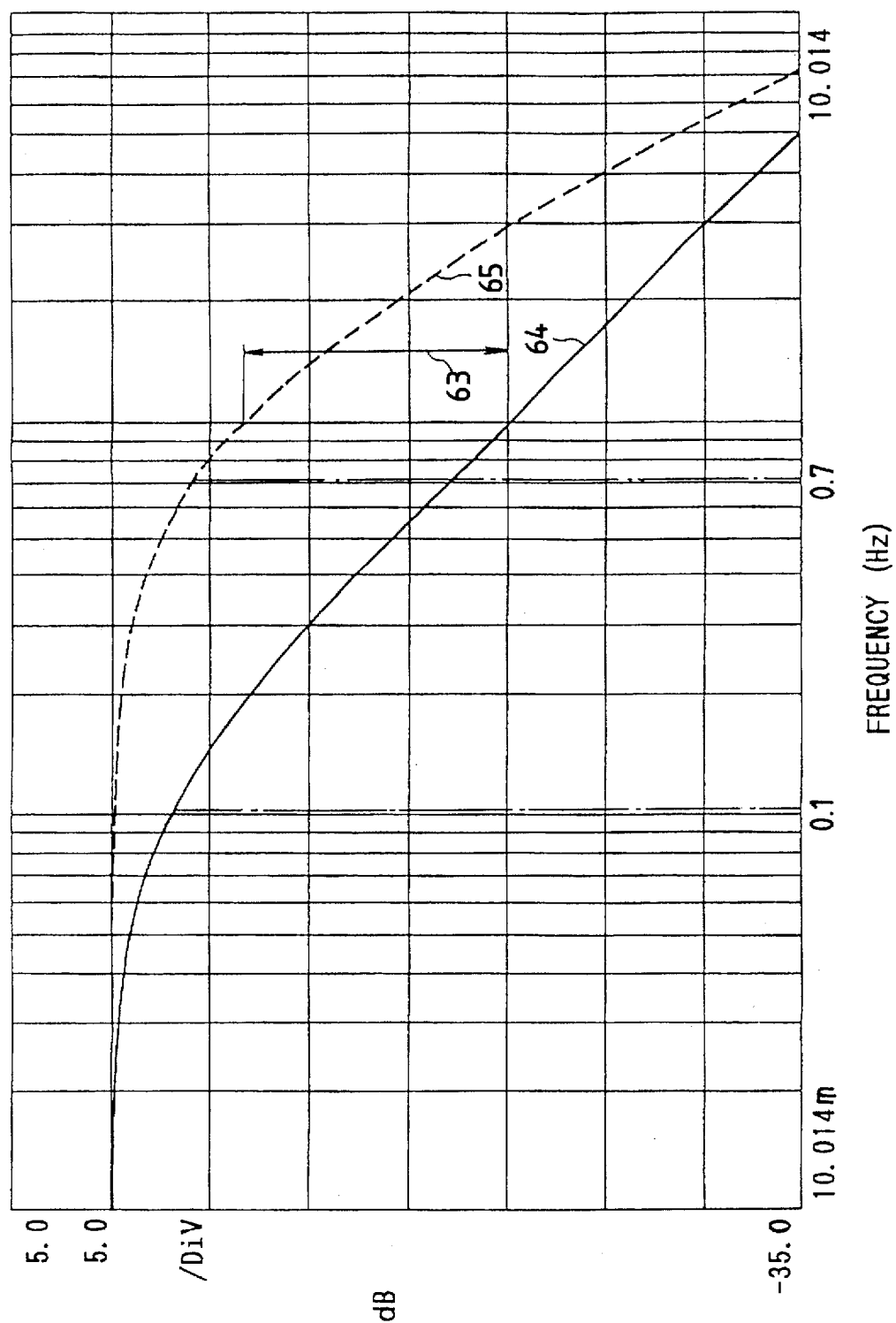

The difference in terms of the structure between the structure shown in FIG. 6A and that shown in FIG. 5A lies in that the amplifying circuits 514p and 514y are replaced by variable amplifying circuits 61p and 61y and variable amplifying circuits 62p and 62y are disposed at the rear of the command signals 518p and 518y. Since the other structures are the same as those of the structure shown in FIG. 5A, their descriptions are omitted here. Then, a case will now be described in which the shutter speed is changed from ⅛ to ¹⁄₆₀ by the photometric means 114 or the shutter speed setting means 115 in a manner similar to the above-described embodiments. When the control means 118 reduces the amplifying ratio of the variable amplifying circuit 61p and 61y in accordance with the output denoting the above-described change, the characteristic designated by the dashed line in FIG. 6B can be obtained. Therefore, the compensating optical means possesses an integrating performance capable of integrating 0.7 Hz or higher.

Since the gain in the range of integration is enlarged as designated by an arrow 63 in this case, it is preferable that the command signal be reduced by simultaneously lowering the amplifying ratios of the variable amplifying circuits 62p and 62y. That is, if the gain of the position control loop is reduced, the gain (amplification) of the input integration is undesirably enlarged. Therefore, the command signal must be reduced to correspond to the above-described enlargement of the gain. As a result, the calculating means can be eliminated when the integration time constant corresponding to the shutter speed to be performed is changed substantially.

The above-described integrating function acts whenever the integration time constant according to embodiments 1 to 4 is changed by changing the loop gain of a so-called speed control loop which constitutes the closed system by the differentiating signals of the light receiving devices 512p and 512y. Therefore, it may be achieved by changing the amplifying ratio of each of the differentiating circuits 515p and 515y, the compensating circuits 516p and 516y and the drive circuits 517p and 517y as an alternative to the variable amplifying, circuits 61p and 61y.

Embodiment 6

Figure 7A:
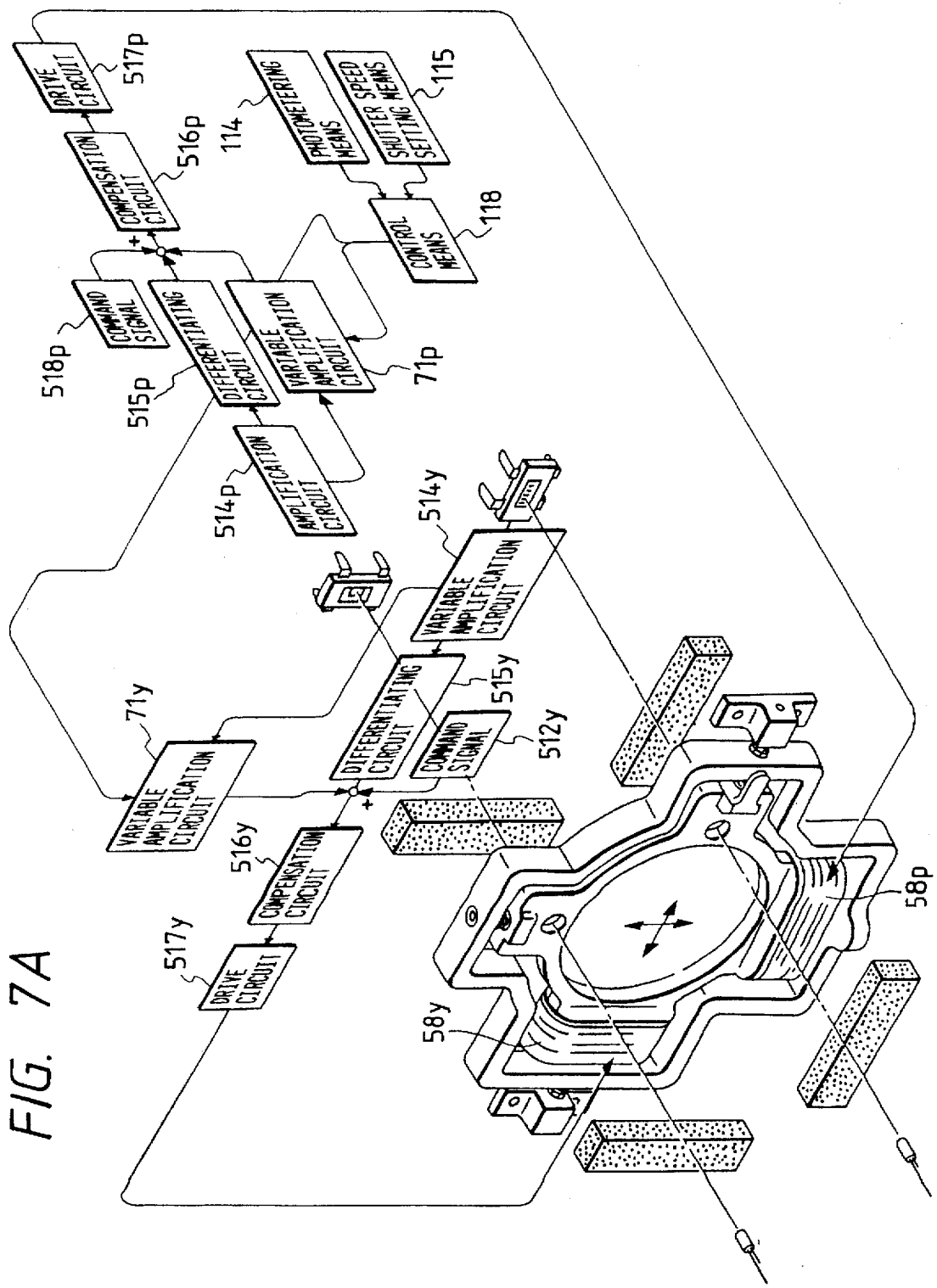
FIGS. 7A and 7B illustrate a modification to Embodiment 5.
Figure 7B:
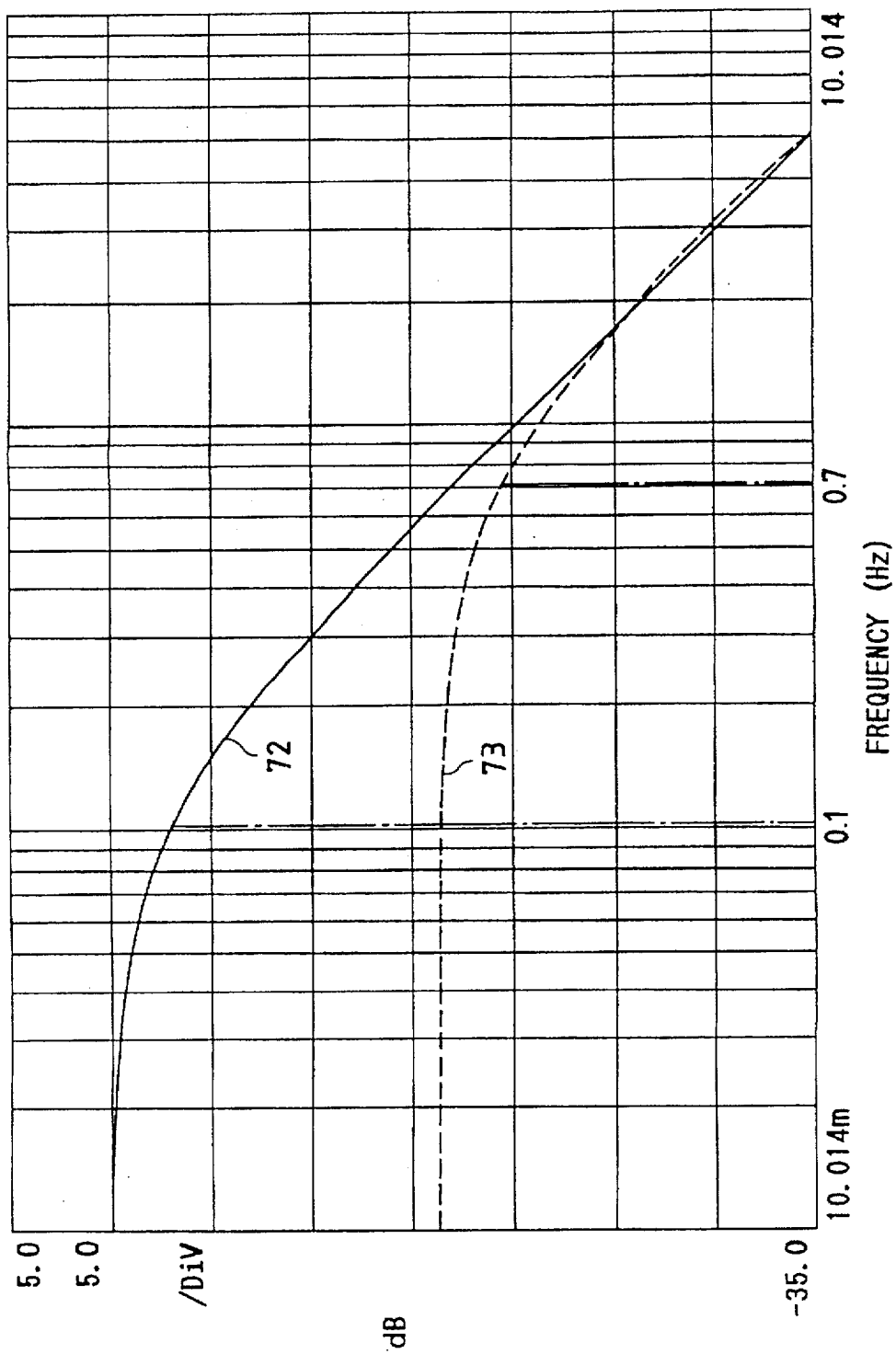
Figure 8A:
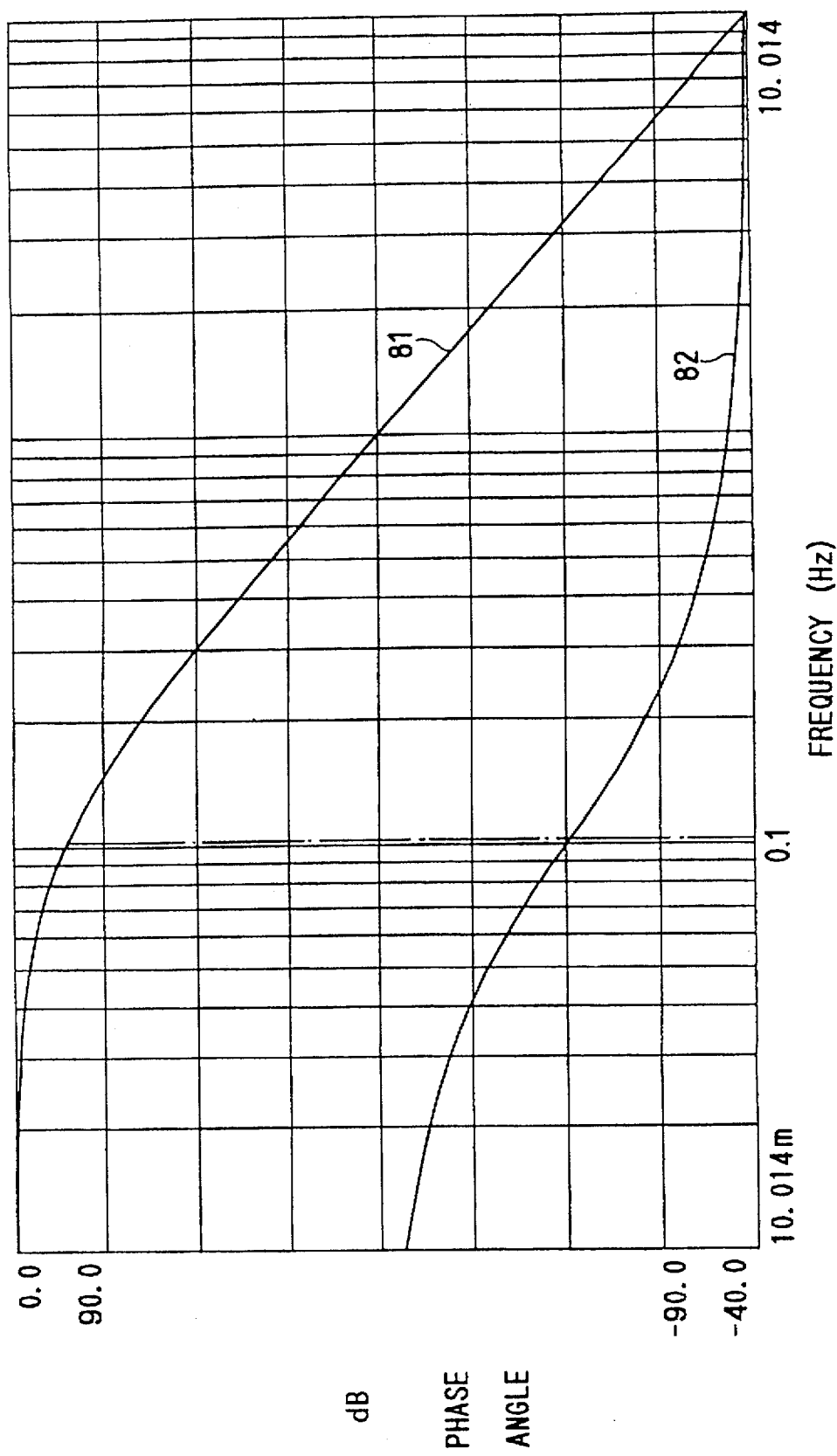
FIGS. 8A and 8B illustrate the characteristic of a conventional image stabilizing system.
Figure 8B:
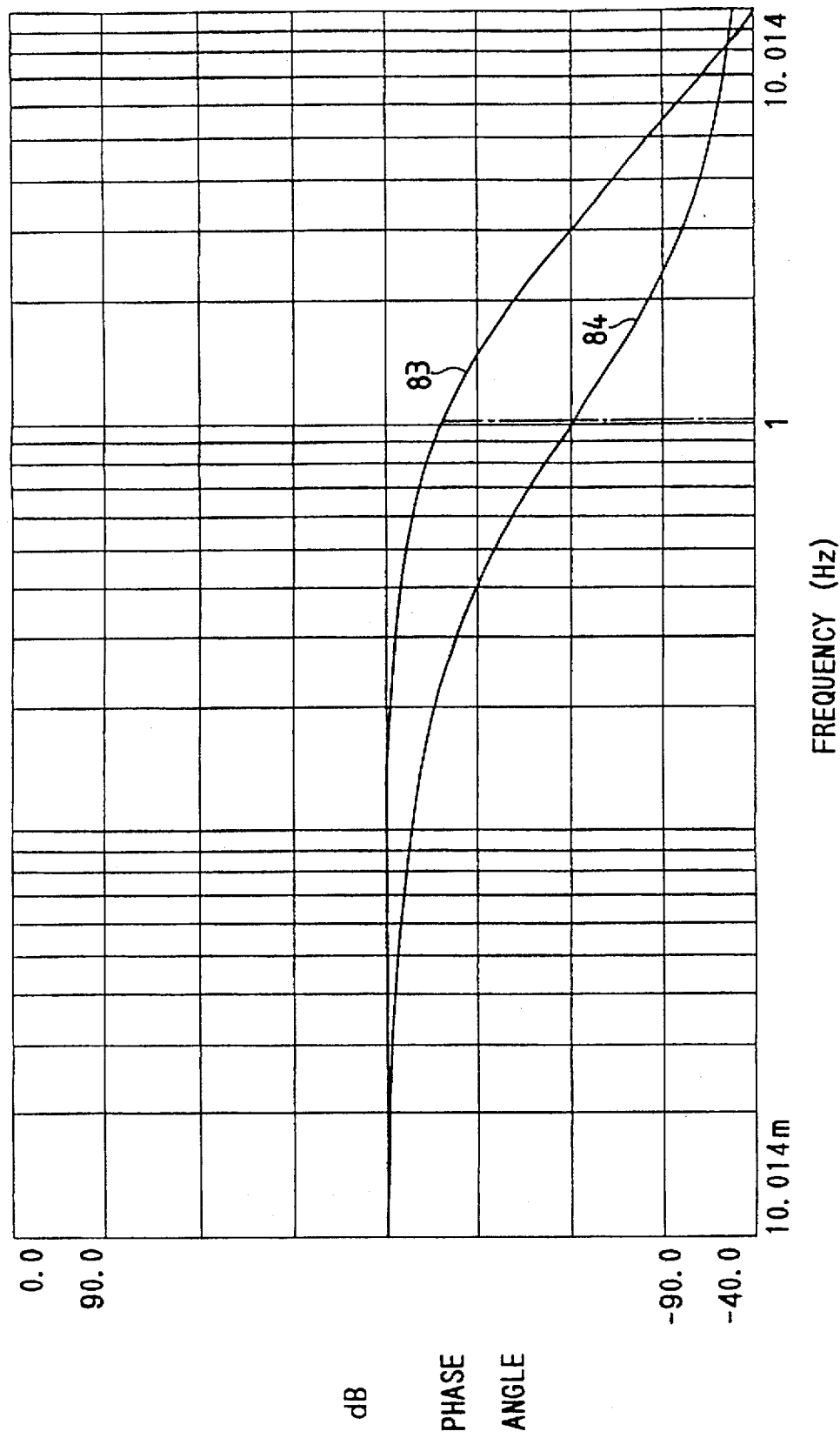
Figure 8C:
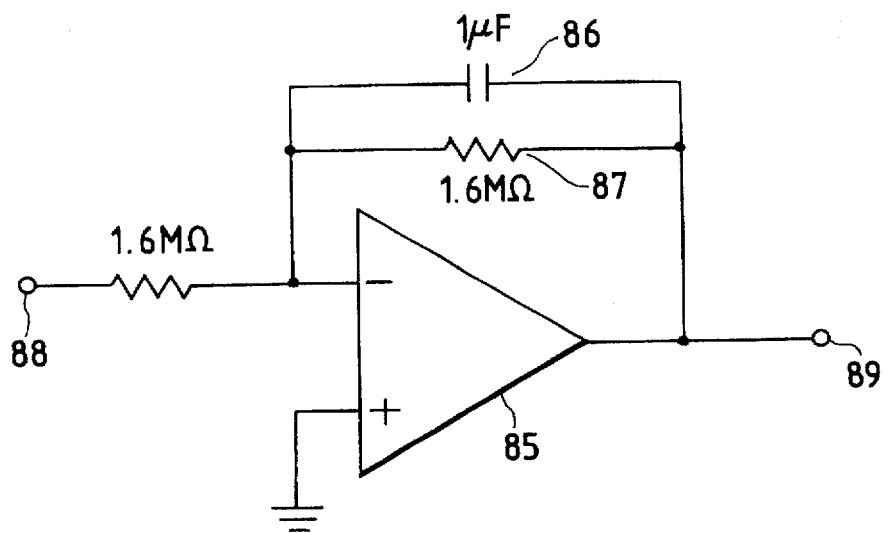
FIG. 8C illustrates a conventional control circuit.
Figure 8E:
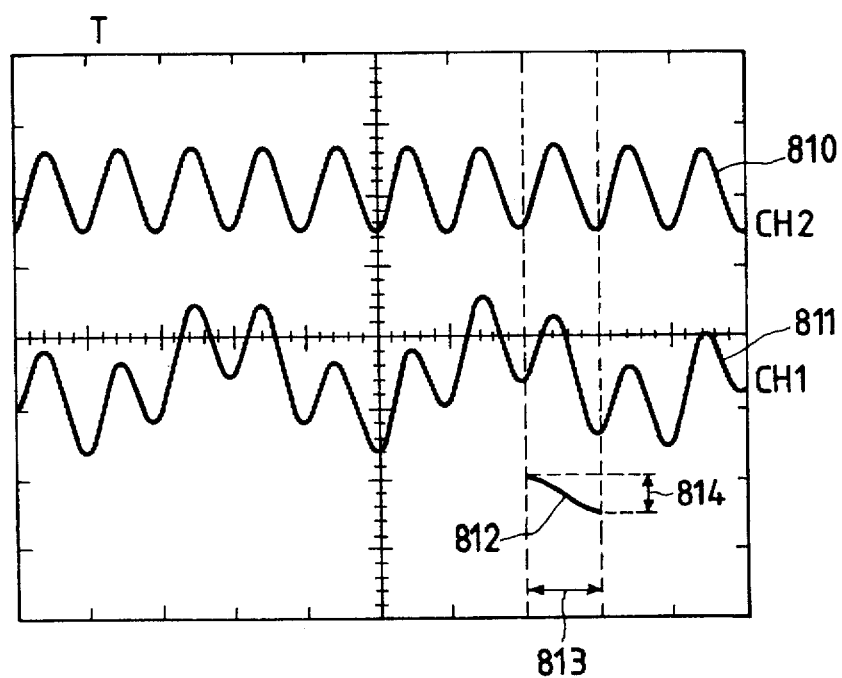
FIGS. 8D and 8E illustrate the problem taken place according to the conventional example.
Figure 8D:
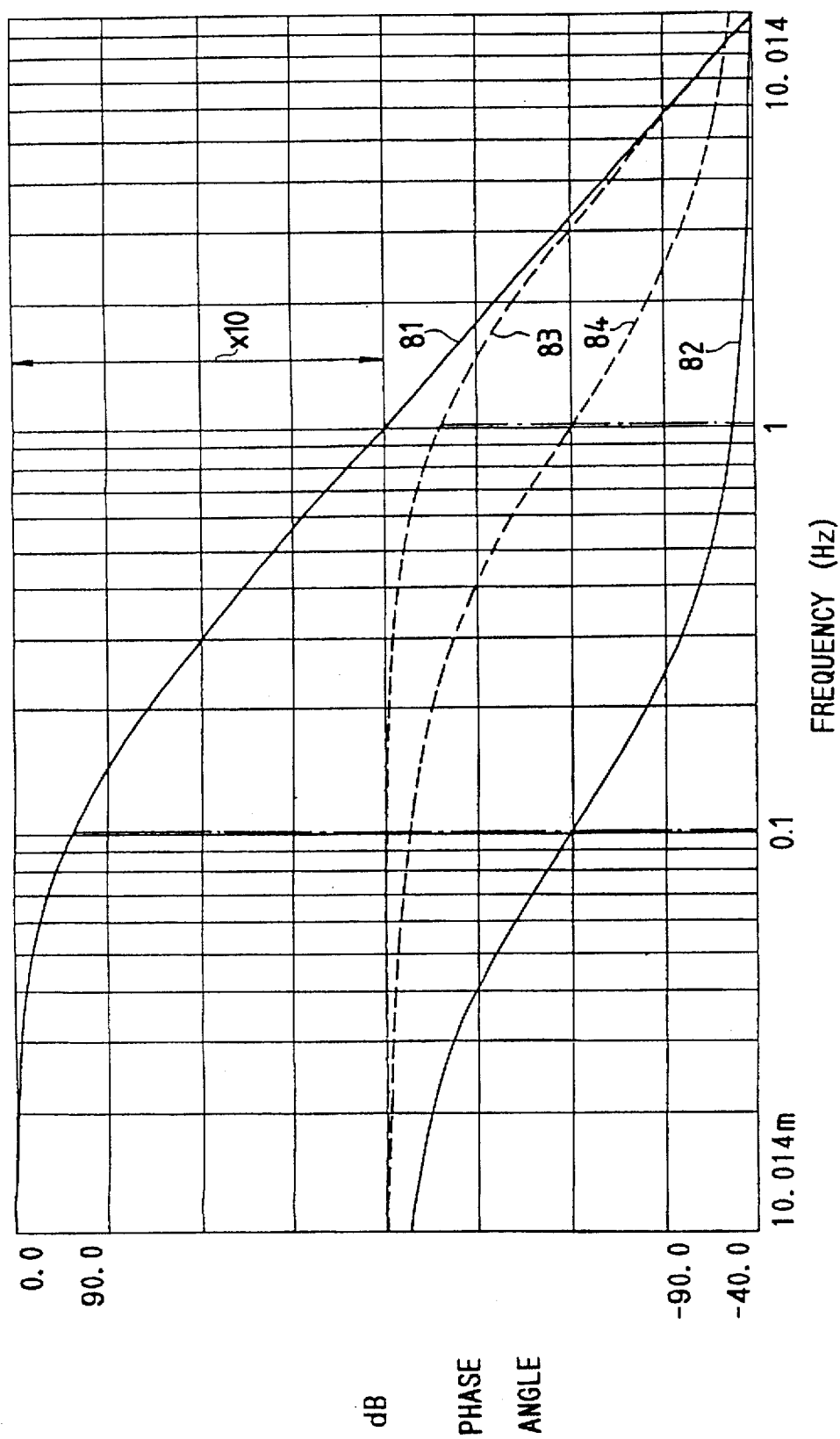

FIG. 7 illustrates a modification to Embodiment 5. The difference from the structure shown in FIG. 6A lies in that a loop constituting in sequential order, the amplifying circuits 514p and 514y→ the variable amplifying circuits 71p and 71y→ the compensating circuits 516p and 516y→ the drive circuits 517p and 517y→ coils 58p and 58y, is disposed individually from the speed control loop constituted via the differentiating circuits 515p and 515y so as to enable the gain of the position control loop to be changed by the variable amplifying circuits 71p and 71y. The other structures are the same as that shown in FIG. 6A. That is, by enlarging the gain of the position control loop, the characteristics of the movement of the compensating lens in response to the command signals 518p and 518y are changed as designated by a dashed line shown in FIG. 7B.

According to this structure, the characteristic capable of integrating 0.1 Hz or higher by a gain 72 designated by a continuous line of FIG. 7B can be realized when the photographic operation is performed at a shutter speed of ⅛ S. When the photographic operation is performed at a shutter speed of ¹⁄₆₀ S, the characteristic capable of integrating 0.7 Hz or higher as a gain 73 designated by a dashed line can be realized by increasing the gain of the position control loop (that is, the amplifying ratios of the variable amplifiers 71p and 71y are enlarged) by the control means 118 similarly to the case shown in FIG. 6A.

As a result of the above-described changes in the characteristic, effects can be obtained in that the waiting time for the stabilization of the image stabilizing system at the time of the photographic operation can be shortened, the photographic operation can be accurately performed while preventing the low frequency error and the necessity of providing the variable amplifying circuits 62p and 62y of the command signals 518p and 518y shown in FIG. 6A can be omitted from the structure.

According to the above-described embodiments, the time constant of the integrator or the gain of the control loop is changed corresponding to the change in the shutter speed in a range between ⅛ S and ¹⁄₆₀ S. The present invention is not limited to the above-described range. It is necessary for the present invention to enlarge any one of the time constant of the integrator, that of the bypass filter or the gain of the control loop to meet the desired characteriistics in a case where the shutter speed is slow. It is necessary to reduce the time constant of the integrator, that of the high-pass filter or the gain of the control loop in a case where the shutter speed is high.

According to the above-described embodiments, the angular velocity sensors 93p and 93y are employed to detect the camera shake. The present invention is not limited to them even if the vibrations due to the camera shake can be detected. For example, a structure may be employed in which an angular acceleration sensor is used and its output is two-order integrated so as to use it as information about the vibration due to the camera shake. The two-order integrator may be arranged in this case so that its time constant can be changed in accordance with the shutter speed. For example, two electric integrators may be connected similarly to the structure according to the first embodiment. As an alternative to this, a structure can be employed in which a two-order integrator comprising a known active filter is used and its time constant can be changed. Furthermore, another structure may be employed in which the first integration is performed electrically so as to convert the angular acceleration into an angular velocity and its output is supplied to the compensating optical mechanism according to the sixth embodiment.

Although the invention has been described in its preferred form with a certain degree of particularily, it should be understood that the present disclosure of the preferred forms including for example the details of construction and the combination and arrangement of parts may be modified without departing from the spirit and the scope of the invention as hereinafter claimed.

I claim:

1. An image stabilizing apparatus for a camera, comprising:

(A) blur detecting means for detecting image blur;

(B) blur compensating means for compensating for image blur;

(C) control means for controlling said blur compensating means in response to an output from said blur detecting means; and (D) varying means capable of changing in accordance with shutter speed, at least one of an integration time constant of said control means, an integration time constant of a high-pass filter, or the gain of a control loop.

2. An image stabilizing apparatus for a camera according to claim 1, wherein said varying means comprises means for reducing, in accordance with a rise in shutter speed, at least one of the integration time constant of said control means, the integration time constant of a high-pass filter, or the gain of a control loop.

3. An image stabilizing apparatus for a camera according to claim 1, wherein said varying means comprises means for enlarging, in accordance with a reduction in shutter speed, at least one of the integration time constant of said control means, the integration time constant of a high-pass filter, or the gain of a control loop.

4. An image stabilizing apparatus for a camera according to claim 1, wherein said varying means comprises means for changing the gain of a speed control loop.

5. An image stabilizing apparatus for a camera according to claim 1, wherein said varying means comprises means for changing the gain of a position control loop.

6. An image stabilizing apparatus for a camera according to claim 1, wherein said blur detecting means comprises means for detecting an angular velocity of an imaging optical system.

7. An image stabilizing apparatus for a camera according to claim 1, wherein said blur compensating means comprises a compensating optical means.

8. A camera comprising:
  (A) blur detecting means for detecting image blur;
  (B) blur compensating means for compensating image blur;
  (C) control means for controlling said blur compensating means in response to an output from said blur detecting means; and
  (D) varying means for changing, in accordance with shutter speed, at least one of an integration time constant of said control means, an integration time constant of a high-pass filter, or the gain of a control loop.

9. A camera according to claim 8, wherein said varying means comprises means for reducing, in accordance with rise in shutter speed, at least one of the integration time constant of said control means, the integration time constant of a high-pass filter, or the gain of a control loop.

10. A camera according to claim 8, wherein said varying means includes means for enlarging, in accordance with reduction in shutter speed, at least one of the integration time constant of said control means, the integration time constant of a high-pass filter, or the gain or a control loop.

11. A camera according to claim 8, wherein said varying means comprises means for changing the gain of a speed control loop.

12. A camera according to claim 8, wherein said varying means comprises means for changing the gain of a position control loop.

13. A camera according to claim 8, wherein said blur detecting means comprises means for detecting an angular velocity of an imaging optical system.

14. A camera according to claim 8, wherein said blur compensating means comprises a compensating optical means.

15. An optical apparatus, comprising:
  (a) vibration detecting means;
  (b) vibration compensating means;
  (c) control means for controlling an operation of said vibration compensating means in accordance with an output of said vibration detection means; and
  (d) varying means for changing a vibration compensation characteristic of said vibration compensating means in accordance with shutter speed.

16. An apparatus according to claim 15, wherein said varying means changes a frequency range in which vibration is compensated for by said vibration compensating means.

17. An apparatus according to claim 16, wherein said varying means increases a lower limit of said frequency range in accordance with an increase in shutter speed.

18. An apparatus according to claim 16, wherein said varying means decreases the lower limit of said frequency range in accordance with a decrease in shutter speed.

19. An apparatus according to claim 15, wherein said optical apparatus performs a photographing function.

20. An image blur prevention apparatus adapted to a camera including a setting portion for setting a shutter speed, said apparatus comprising:
  an image blur prevention device that compensates for image blur; and
  a varying device that varies an operation characteristic of said image blur prevention device in accordance with a shutter speed set by said setting portion.

21. An apparatus according to claim 20, wherein said varying device includes means for varying a frequency characteristic of said image blur prevention device.

22. An apparatus according to claim 21, wherein said image blur prevention device includes an image blur compensating device that compensates for an image blur, and said varying means changes a frequency range in which vibration is compensated for by said vibration compensating device.

23. An apparatus according to claim 22, wherein said varying means increases a lower limit of said frequency range in accordance with an increase in shutter speed.

24. An apparatus according to claim 22, wherein said varying means decreases the lower limit of said frequency range in accordance with a decrease in shutter speed.

25. An apparatus according to claim 20, wherein said image blur prevention device includes means for performing an image blur prevention operation in accordance with a signal corresponding to a state of image blur and said varying device includes means for varying a response characteristic of said image blur prevention device according to a signal corresponding to the state of image blur.

26. An apparatus according to claim 25, wherein said image blur prevention device includes means for performing an image blur compensation operation in accordance with a signal corresponding to a fluctuation state of a device for which said image blur prevention device performs the image blur compensation operation.

27. An apparatus according to claim 20, further comprising:
  a signal processing circuit that performs a predetermined signal processing in accordance with a signal corresponding to the image blur, wherein said image blur prevention device includes means for performing the image blur prevention operation in accordance with a signal derived from said predetermined signal processing circuit, and said varying device includes means for varying a signal processing characteristic of said signal processing circuit.

28. An apparatus according to claim 27, wherein said signal processing circuit includes a high-pass filter, and said varying means includes means for varying a time constant of said high-pass filter.

29. An apparatus according to claim 20, further comprising:
  a control circuit that controls said image blur prevention device in accordance with the signal corresponding to the image blur, and wherein said varying device includes means for varying a control loop gain of a control loop of said control circuit.

30. An apparatus according to claim 20, wherein said image blur prevention device includes means for optically compensating for image blur.

31. An apparatus according to claim 30, wherein said image blur prevention device includes means for deflecting a light beam.

32. An apparatus according to claim 20, wherein said image blur prevention device includes means for performing an image blur prevention operation by moving a compensating optical member in an optical path.

33. An apparatus according to claim 20, wherein said image blur prevention device includes means for preventing image blur for a photographic image of the camera.

34. An apparatus according to claim 22, wherein said varying device includes means for reducing said frequency range in accordance with an increase in the shutter speed.

35. An apparatus according to claim 28, wherein said varying device includes means for decreasing said time constant in accordance with an increase in the shutter speed.

36. An apparatus according to claim 27, wherein said signal processing circuit includes an integrating circuit and said varying device includes means for varying an integration time constant of said integrating circuit in accordance with the shutter speed.

37. An apparatus according to claim 36, wherein said varying device includes means for decreasing the integration time constant in accordance with an increase in the shutter speed.

38. An apparatus according to claim 20, wherein the camera includes a photometric device, and said setting portion includes means for determining the shutter speed in accordance with a result of photometry by said photometric device.

39. An apparatus according to claim 20, wherein said setting portion includes means for enabling a user to arbitrarily set the shutter speed.

40. An apparatus for use with an image blur prevention device adapted to a camera including a setting portion for setting a shutter speed, said apparatus comprising:

an input portion that inputs shutter speed information indicated by said setting portion of the camera, and a varying device that varies an operation characteristic of said image blur prevention device in accordance with the shutter speed information input to said input portion.

41. An optical apparatus adapted for use with a camera including a setting portion for setting a shutter speed, said apparatus comprising:

an image blur prevention device that compensates for image blur; and a varying device that varies an operation characteristic of said image blur prevention device in accordance with a shutter speed set by said setting portion.

42. A camera including a setting portion for setting a shutter speed, said camera comprising:

an image blur prevention device that compensates for image blur;

an input portion that inputs shutter speed information indicated by said setting portion of said camera; and a varying device that varies an operation characteristic of said image blur prevention device in accordance with the shutter speed information input to said input portion.

* * * * *

UNITED STATES PATENT AND TRADEMARK OFFICE
CERTIFICATE OF CORRECTION

PATENT NO. : 5,734,932
DATED : March 31, 1998
INVENTOR(S) : KOICHI WASHISU

It is certified that error appears in the above-indentified patent and that said Letters Patent is hereby corrected as shown below:

Column 1

Line 13, "and," should read --and--.
    Line 15, "unit" should read --unit,--.

Column 2

Line 27, ")" (first occurrence) should be deleted.

Column 3

Line 9, "gravitational," should read --gravitational--.

Column 4

Line 57, "structures" should read --structure--.

Column 5

Line 9, "taken" should read --taking--.

Column 6

Line 7, "capacity" should read --capacitance--.
    Line 18, "signal" should read --signal,--.

UNITED STATES PATENT AND TRADEMARK OFFICE
CERTIFICATE OF CORRECTION

PATENT NO. : 5,734,932

DATED : March 31, 1998

INVENTOR(S) : KOICHI WASHISU

It is certified that error appears in the above-indentified patent and that said Letters Patent is hereby corrected as shown below:

<u>Column 7</u>

Line 16, "by" should be deleted.

<u>Column 8</u>

Line 12, "working" should read --worked--.

<u>Column 11</u>

Line 37, "amplifying," should read --amplifying--.

<u>Column 12</u>

Line 15, "characteriistics" should read --characteristics--.
    Line 41, "particularily" should read --particularity--.
    Line 42, "forms" should read --form,--.
    Line 44, "parts" should read --parts,--.

Signed and Sealed this

Twenty-second Day of September, 1998

*Attest:*

BRUCE LEHMAN

*Attesting Officer*      *Commissioner of Patents and Trademarks*